US008562759B2

(12) United States Patent
Cheney et al.

(10) Patent No.: US 8,562,759 B2
(45) Date of Patent: Oct. 22, 2013

(54) COMPOSITIONS AND METHODS FOR DETERMINING ALLOYS FOR THERMAL SPRAY, WELD OVERLAY, THERMAL SPRAY POST PROCESSING APPLICATIONS, AND CASTINGS

(75) Inventors: Justin Lee Cheney, San Francisco, CA (US); John Hamilton Madok, San Diego, CA (US)

(73) Assignee: Scoperta, Inc., San Diego, CA (US)

( * ) Notice: Subject to any disclaimer, the term of this patent is extended or adjusted under 35 U.S.C. 154(b) by 44 days.

(21) Appl. No.: 12/885,276

(22) Filed: Sep. 17, 2010

(65) Prior Publication Data

US 2011/0068152 A1 Mar. 24, 2011

Related U.S. Application Data

(63) Continuation-in-part of application No. 12/569,713, filed on Sep. 29, 2009.

(60) Provisional application No. 61/243,498, filed on Sep. 17, 2009, provisional application No. 61/309,354, filed on Mar. 1, 2010.

(51) Int. Cl.
*C22C 38/22* (2006.01)
*C22C 38/32* (2006.01)
*C22C 38/44* (2006.01)
*C22C 38/54* (2006.01)
*B23K 35/24* (2006.01)

(52) U.S. Cl.
USPC ........... 148/328; 148/330; 148/333; 148/528; 148/529; 148/537; 420/100; 420/104; 420/113; 420/114; 420/121; 420/127; 228/262.41; 219/76.1; 219/146.23

(58) Field of Classification Search
USPC ......... 148/328, 333, 537, 540, 528, 529, 330; 420/100, 104–114, 101, 121, 122, 127; 219/76.1, 146.23; 75/254, 246; 428/682–685; 228/262.4, 262.41, 228/262.42

See application file for complete search history.

(56) References Cited

U.S. PATENT DOCUMENTS

| 2007/0029295 A1 | 2/2007 | Branagan |
| 2008/0053274 A1 | 3/2008 | Branagan |
| 2008/0149397 A1 | 6/2008 | Overstreet |

FOREIGN PATENT DOCUMENTS

WO 2006/086350 A2 8/2006

OTHER PUBLICATIONS

International Search Report for International App No. PCT/US2010/049381, completed Nov. 5, 2010.
International Search Report for International App. No. PCT/US2011/051746, date of mailing Jun. 6, 2012.

(Continued)

*Primary Examiner* — Deborah Yee
(74) *Attorney, Agent, or Firm* — Sheppard Mullin Richter & Hampton LLP

(57) ABSTRACT

Disclosed herein are iron-based alloys having a structure comprising fine-grained ferritic matrix and having a 60+ Rockwell C surface, wherein the ferritic matrix comprises <10 μm Nb and W carbide precipitates. Also disclosed are methods of welding comprising forming a crack free hardbanding weld overlay coating with such an iron-based alloy. Also disclosed are methods of designing an alloy capable of forming a crack free hardbanding weld overlay, the methods comprising the step determining an amorphous forming epicenter composition, determining a variant composition having a predetermined change in constituent elements from the amorphous forming epicenter composition, and forming and analyzing an alloy having the variant composition.

21 Claims, 27 Drawing Sheets

(56) References Cited

OTHER PUBLICATIONS

Khalifa H E et al: Effect of Mo-Fe substitution on glass forming ability, thermal stability, and hardness of Fe-C-B-Mo-Cr-W bulk amorphous alloys. Materials Science and Engineering, vol. 490, No. 1-2, Aug. 25, 2008, pp. 221-228.

Cheney J et al: Development of quaternary Fe-based bulk metallic glasses. Materials Science and Engineering A, vol. 492, No. 1-2, Sep. 25, 2008, pp. 230-235.

Branagan D J et al: Developing extreme hardness (>15GPa) in iron based nanocomposites, Composites Part A: Applied Science and Manufacturing, Elsevier Science Publishers B.V., Amsterdam, NL, vol. 33, No. 6, Jun. 1, 2002, pp. 855-859.

Atomic radii for metallic glass structures

| Element | At # | Radius (pm) | Element | At # | Radius (pm) | Element | At # | Radius (pm) |
|---|---|---|---|---|---|---|---|---|
| C | 6 | 77 | Ga | 31 | 132 | Mg | 12 | 160 |
| B | 5 | 78 | V | 23 | 134 | Sc | 21 | 164 |
| P | 15 | 100 | Zn | 30 | 138 | Nd | 60 | 164 |
| Si | 14 | 102 | Mo | 42 | 139 | Hf | 72 | 167 |
| Be | 4 | 112 | Pd | 46 | 141 | Gd | 64 | 174 |
| Ge | 32 | 114 | W | 74 | 141 | Er | 68 | 176 |
| Cu | 29 | 127 | Ag | 47 | 142 | Dy | 66 | 177 |
| Fe | 26 | 128 | Al | 13 | 143 | La | 57 | 187 |
| Co | 27 | 128 | Ti | 22 | 146 | Y | 39 | 180 |
| Ni | 28 | 128 | Nb | 41 | 146 | Sm | 62 | 181 |
| Cr | 24 | 130 | Ta | 73 | 149 | Ce | 58 | 182 |
| Mn | 25 | 132 | Zr | 40 | 158 | Ca | 20 | 197 |

Fig. 1A

COMPOSITIONS AND METHODS FOR DETERMINING ALLOYS FOR THERMAL SPRAY, WELD OVERLAY, THERMAL SPRAY POST PROCESSING APPLICATIONS, AND CASTINGS

CROSS-REFERENCE TO RELATED APPLICATIONS

This application is a continuation in part of and claims priority from U.S. patent application Ser. No. 12/569,713 filed Sep. 29, 2009, this application further claims priority from Provisional U.S. Application Ser. No. 61/243,498 filed Sep. 17, 2009; and Provisional U.S. Application Ser. No. 61/309,354 filed Mar. 1, 2010; each of which is hereby incorporated herein by reference in its entirety for all purposes.

TECHNICAL FIELD

The present invention relates generally to metallurgy. More particularly, some embodiments relate to: amorphous, nanocrystalline, or microcrystalline metals; and weld overlay materials.

DESCRIPTION OF THE RELATED ART

Amorphous metallic materials made of multiple components with a non-crystalline structure are also known as "metallic glass" materials. The materials often have different behaviors from corresponding metals with crystalline structures. Notably, an amorphous metallic material is usually stronger than a crystalline alloy of the same or similar composition. Bulk metallic glasses are a specific type of amorphous materials or metallic glass made directly from the liquid state without any crystalline phase. Bulk metallic glasses typically exhibit slow critical cooling rates, e.g., less than 100 K/s, high material strength and high resistance to corrosion. Bulk metallic glasses may be produced by various processes, e.g., rapid solidification of molten alloys that the atoms of the multiple components do not have sufficient time to align and form crystalline structures. Alloys with high amorphous formability can be cooled at slower rates and thus be made into larger volumes and can be produced using common industrial practices such as thermal spray processing or welding. The determination of an amorphous material is commonly made using X-ray diffractometry. Amorphous materials lack translational symmetry, and thus produce X-ray diffraction spectra composed of a single broad hump as opposed to the sharp peaks defined over a narrow diffraction angle range typical to crystalline materials.

The formation of metallic glasses is very complex as compared to conventional crystalline materials, and thus modeling efforts designed to understand and predict production of metallic glasses are not very accurate. Many modeling criteria have been developed to predict certain aspects of metallic glass design. These models typically fail to include specific quantifiable components and therefore fail to provide concrete metallic glass formation ranges. As a result, metallic glasses are developed primarily through a trial and error experimental process, where many alloys must be produced and evaluated before a metallic glass composition is discovered.

Despite the many advantageous properties of metallic glasses, it is often useful to contain a level of crystalline in the material ranging from small fraction to completely crystalline. Nanocrystalline or fine-scale grained materials are known to contain higher hardness and strength than equivalent larger grained materials. Metallic glasses are known to form nanocrystalline precipitates when cooled a slower rate than their glass forming ability requires. Even slower cooling produces complete crystallinity ranging from nanometer sized grains and up. In general, materials which form metallic glasses have slower crystallization kinetics and will thus form smaller grain sized than common materials processed under the same conditions. In addition controlling the rate of cooling, it is often possible to dictate the crystallinity fraction and grain size of a material though compositional control. By altering the composition from its optimum glass forming concentration, the precipitation of a particular crystalline phase can be encouraged under appropriate processing conditions. This technique has been used to increase ductility in metallic glasses.

Most materials, even those capable of forming completely amorphous structures under thermal spray processing, do not have slow enough crystallization kinetics to form an amorphous material when welded. Nevertheless, the crystallization kinetics are such that a fine-scale grain structure is likely to form.

Most hardfacing materials, especially when dealing with weld overlays capable of exceeding 60 Rockwell C hardness, suffer from cracking during the weld process as well as poor toughness. In addition to other problems, this cracking limits such a materials use in any application where impact occurs. Accordingly, the durability of hardfacing weld overlays can be substantial improved by reducing the potential for cracking and increasing the overall toughness of the weld.

Using tungsten carbide ("WC") as a hard particle reinforcement in the weld overlay technique is another typical method of hardfacing. This technique involves pouring WC into the molten weld bead as the hardfacing material is being welded onto the substrate. In many applications this technique offers a very good hardfacing layer, however it is difficult to apply a hardfacing layer of this type using a hard material as the matrix for the WC particles, particularly when cracking in the hardfacing layer is not desirable. Extreme wear applications often demand improved wear performance beyond that which can be offered using a ductile matrix with WC particles, because the matrix itself is likely to wear away at an accelerated rate leaving the hard particles exposed to shatter or pull out from the surface. Under conditions of extreme impact as well as wear it is important to eliminate cracking in the weld bead.

Hardbanding is a technique used to protect the drill stein during operation in oil and gas drilling. The hardbanding is a weld overlay made onto a round tool joint, typically 6" in diameter, which is applied in the field. The hardbanding overlay is designed to be a hard wear resistant alloy which centers the drill stem within the casing, as well as protects the drill stem from wearing itself away on the casing.

BRIEF SUMMARY OF EMBODIMENTS OF THE INVENTION

According to certain aspects of the present disclosure, weld overlay materials are disclosed. In some embodiments, one or more materials of the present disclosure can be used as a superior weld overlay material for the protection of tool joints in oil and gas drilling operations. In some embodiments, one or more materials of the present disclosure can be used for other overlay hardfacing applications.

According to certain aspects of the preset disclosure, an iron-based alloy is provided. The alloy can have a microstructure comprising a fine-grained ferritic matrix. The alloy can have a 60+ Rockwell C surface. The ferritic matrix can comprise <10 μm Nb and W carbide precipitates.

According to certain aspects of the present disclosure, a method of welding is provided. The method can comprise forming a crack free hardbanding weld overlay coating with an iron-based alloy. The alloy can have a composition comprising a fine-grained ferritic matrix. The alloy can have a 60+ Rockwell C surface. The ferritic matrix can comprise <10 μm Nb and W carbide precipitates.

According to certain aspects of the present disclosure, a method of designing an alloy capable of forming a crack free hardbanding weld overlay is provided. The method can comprise the step of determining an amorphous forming epicenter composition. The method can further comprise the step of determining a variant composition having a predetermined change in constituent elements from the amorphous forming epicenter composition. The method can further comprise forming and analyzing an alloy having the variant composition.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1A is a table illustrating a variety of atomic radii for some elements that may serve as constituents of some embodiments of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figures 1B, 1C:
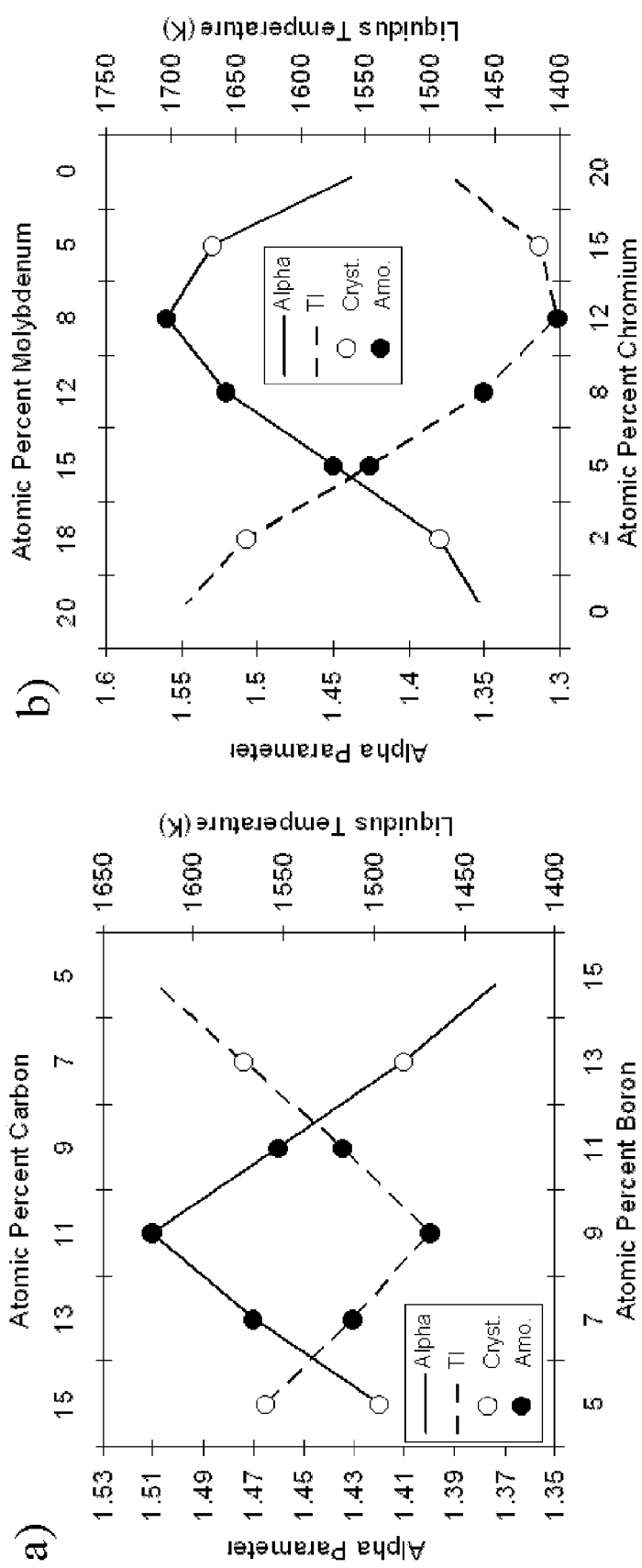
FIGS. 1B-1I are graphs illustrating various characteristics of some embodiments of the invention.
Figures 1D, 1E:
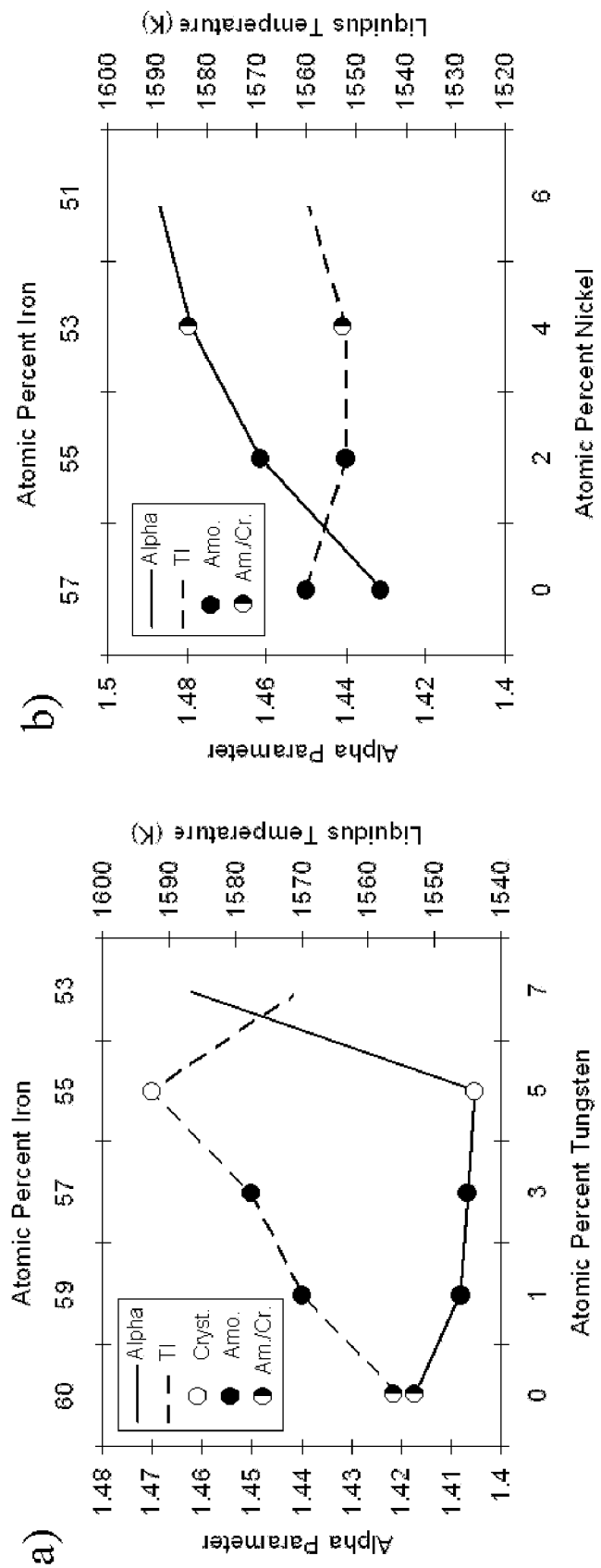
Figures 1F, 1G:
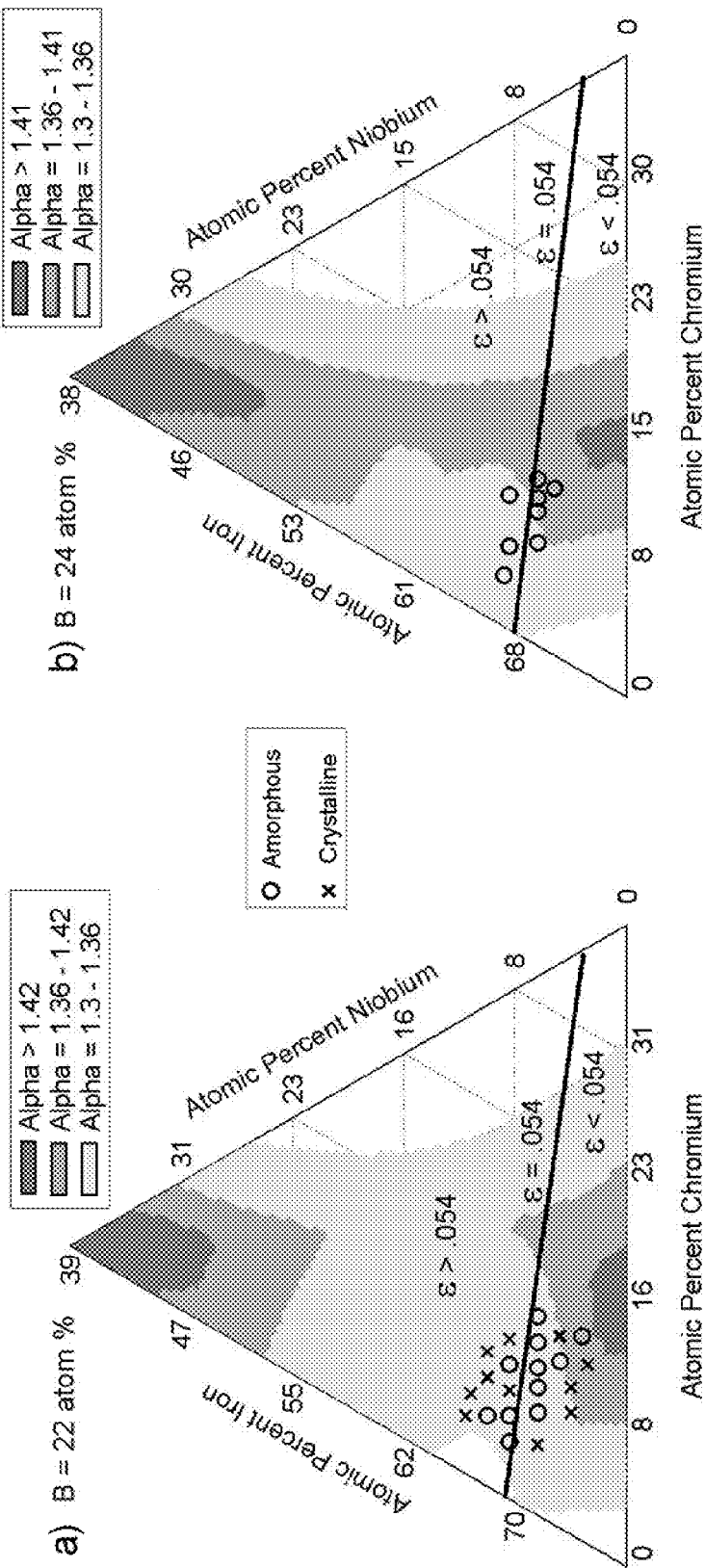
Figures 1H, 1I:
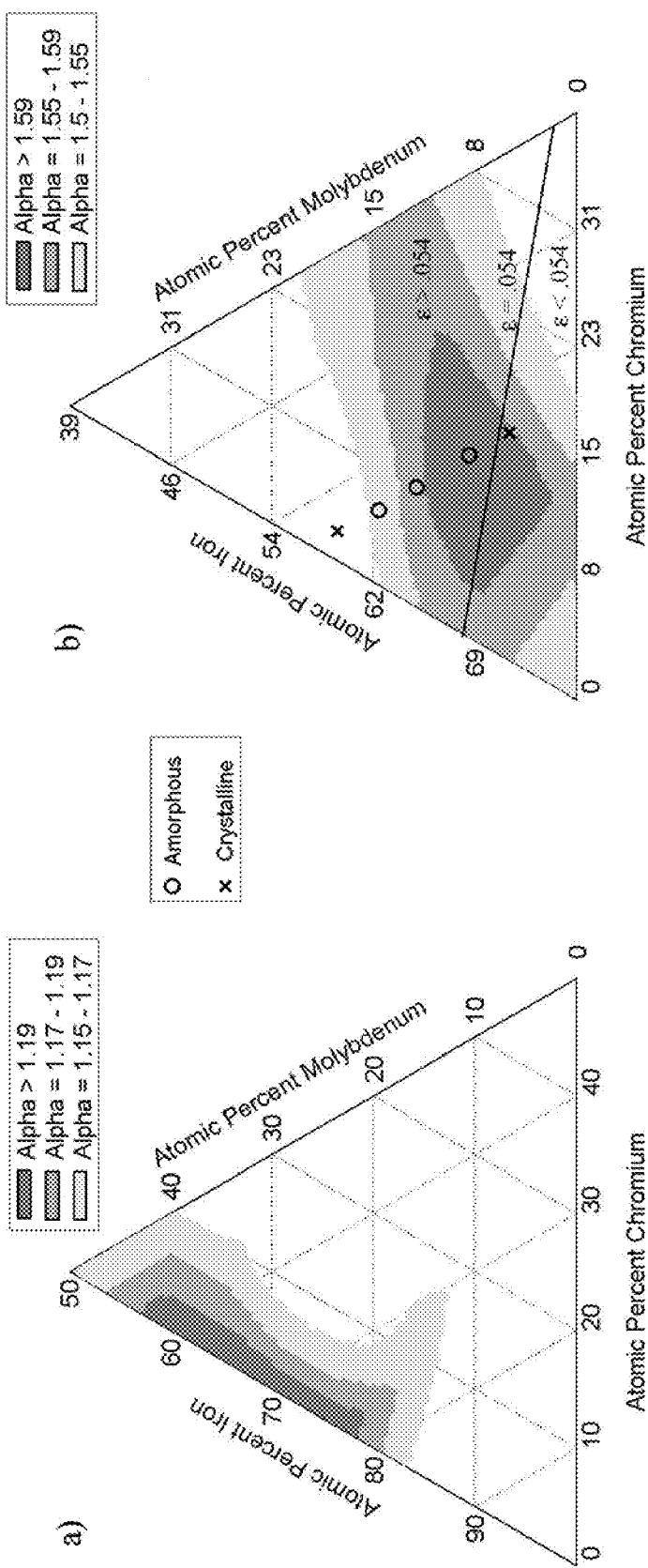

Some embodiments are described herein in terms of structural sites. In these embodiments some components occupy solvent sites and others occupy primary solute sites. In further alloys, further components occupy secondary solute sites and in some cases components occupy tertiary solute sites. In many embodiments, the primary solute elements are defined as the solute which are larger than the solvent elements. For example, the primary solute elements may be approximately as at least 5% larger than the solvent elements. FIG. 1A is a table illustrating atomic radii of various elements that may serve as components in various alloys according to some embodiments of the invention.

In some embodiments of the invention, a class or group of compositions is determined using two criteria. In these embodiments, the first criteria is that the primary solute elements are larger than the solvent element, and the second criteria is that the thermodynamic properties of the compositions vary from those that would be predicted from the constituent elements alone. As an example of the first criteria, the primary solute element may comprise an element that is at least approximately 10% larger than the solvent element.

In one embodiment, a first class of alloys that satisfy these criteria may be formed when the solvent elements comprise transition metals ranging in atomic sizes from approximately 1.27 to 1.34 Å. As illustrated in FIG. 1A, some of these candidate elements may comprise V, Cr, Mn, Fe, Co, Ni, or Cu, for example. In this embodiment, some bulk metallic glasses may be formed by the addition of a larger primary solute element having an atomic size at least approximately 10% larger than the size of the solvent element. In this embodiment, these primary solute elements range from elements having atomic radii of at least about 1.41 Å for solvent elements having atomic radii of approximately 1.27 Å to elements having atomic radii of at least about 1.47 Å for solvent elements having atomic radii of 1.34 Å. For example, for Cu as a solvent, some possible candidate primary solutes comprise Mo, Pd, W, Ag, Al, Ti, or larger elements. Compositions formed according to this embodiment may further accommodate secondary or tertiary solute elements comprising metalloids or nonmetal elements. For example, such elements might comprise C, B, Si, P, N, or S. In further embodiments, this range of compositions may be more precisely defined according to certain thermodynamic properties.

In these embodiments, the second criteria for the class of compositions is satisfied when the alloys have a low liquid energetic state in comparison with the energy of the solid-state. For example, deep eutectics may be used as an experimental measure of the thermodynamic strength of the liquid in relation to the potential solid phases which it can form. In some embodiments, these energy comparisons may be performed by quantifying the eutectics of the compositions using a comparison between the actual melting or liquidus temperature of a specific alloy is compared to a calculated predicted liquidus temperature of the alloy. In these embodiments, the calculated liquidus temperature may be determined using a rule of mixtures type equation using the atomic percentages of the component elements and their respective pure melting temperature. For example, the calculated liquidus temperature $T_c$ is determined according to the equation $T_c = \Sigma x_i T_i$ where $x_i$ is the at. % of the component i and $T_i$ is its pure melting temperature. For example, alloys within the compositional ranges of some embodiments of the invention may have calculated liquidus temperatures, $T_c$, that are at least approximately 5% greater than the actual melting temperatures of the alloys. In further embodiments, different ratios between actual and calculated melting temperatures may be used. For example, as described herein some embodiments may comprise alloys having some degree of crystallinity, for example some alloys may comprise a micro or nanocrystalline alloys. Alloys within these embodiments may have calculated temperatures that are, for example, at least approximately 2% or 3% greater than the actual melting temperatures of the alloys. In still further embodiments, even deeper eutectics might be desirable for some applications, such as situations where molten alloys will experience lower than typical cooling rates. Alloys within these embodiments may have calculated temperatures that are, for example, at least approximately 7% or 8% greater than the actual melting temperatures of the alloys.

In some embodiments, components of alloys may occupy distinct topological sites within the alloy. For example, a larger primary solute element may act as a centralized cluster site for solvent atoms to bind to during cooling. In these embodiments, these clusters allow the formation of a non-translational atomic packing scheme which resists crystallization. Furthermore, these larger solute atoms may generate elastic strain energy in an emerging crystalline embryo lattice composed of solvent elements and increase the likelihood for such an embryo to re-dissolve instead of acting as a seed for crystallization. In some instances, the topologies of these embodiments further allow secondary and tertiary solute elements to occupy interstitial sites that occur between the dense packing clusters. In some cases, these secondary or tertiary solute elements may create strong chemical interactions with the solvent elements.

In one embodiment, a class of metallic glass forming alloys comprises transition metal solvents with atomic radius sizes ranging from 1.27 to 1.34 Å. In this embodiment, primary solute sites may make up between 3 to 20 at. % of the alloy composition. These primary solute sites may be occupied by elements with atomic radii that are at least approximately 10% larger than those of the solvent. This embodiment may further comprise secondary solute sites that comprise approximately 10 to 25 at. % of the alloy composition. These secondary solute sites may be occupied by metalloid or non-metal elements, for example C, B, Si, P, N or S. The alloys within this embodiment further comprise alloys having melting temperatures that are at least approximately 5% less than a theoretical melting temperature calculated using a sum of the pure melting temperature of the components of the alloy weighted by their atomic percentages. FIGS. 1B through 1I illustrates some characteristics of examples of such alloys. In these figures the alpha parameter is determined according to the formula $$\alpha = \frac{\sum x_i T_i}{T_l},$$

where $x_i$ is atomic percent of the ith element, $T_i$ is the melting temperature of ith element, and $T_l$ is the liquidus temperature of the alloy. As these figures illustrate, alloys that form amorphous structures tend to occur in ranges described herein.

In some alloys within this class, the number of available—or occupied—solute sites may vary according to various characteristics of the components. For example, the available secondary solute site may be somewhat dependent on characteristics of the primary solute or the solvent. For example, a primary solute that has a radius approximately 15% larger than that of the solvent may allow different secondary solutes or different amounts of secondary solutes to be used while still retaining metallic glass forming characteristics.

In a further embodiment of the invention, a second class of alloys may comprise alloys having solvent elements with atomic sizes in the range of 1.39 to 1.58 Å. For example, solvent elements within this second class may comprise Al, Ti, Zr, Nb, or Mo. In some instances, alloys within this class can accommodate a tertiary solute element in addition to primary and secondary solute elements. In this embodiment, primary solute sites may make up approximately 10 to 30 at. % of the alloy composition. These primary solute sites may be occupied by metallic elements having atomic radii that are at least approximately 5% smaller than the solvent elements. These alloys may further comprise elements making up 2 to 10 at. % of the alloy composition and occupying secondary solute sites. In some embodiments, these secondary solute elements may comprise elements having atomic radii that are at least approximately 5% larger than the solvent elements. In further embodiments, these alloys may further comprise elements making up 5-20 at. % of the alloy composition and occupying tertiary solute sites. These elements occupying tertiary solute sites may comprise metalloid or nonmetal elements such as C, B, Si, P, N, or S. Similarly to the first class of alloys, the alloys of these embodiments may be further defined according to their melting temperatures, wherein their melting temperature is below a predetermined percentage of a theoretical integer calculated using a weighted sum of the pure melting temperatures of the alloy's components. For example, in so embodiments the alloys may be defined according to a melting temperature that is at least approximately 5% less than such a theoretical temperature. In some embodiments, the addition of this tertiary solute element may increase packing density and thereby further increase viscosity of the alloy.

In further embodiments of the invention, the described alloys may be modified to produce alloys forming micro or nanocrystalline structures. For example, the relative sizes or amounts of the solvents or solutes may be varied to promote such formations. For example, the use of 1-2% more of a solvent may result in an alloys that forms a nanocrystalline or fine-grained structure instead of an amorphous structure. Additionally, the temperature requirements of some embodiments may be relaxed so that alloys having slightly higher melting temperatures, such as 2% less than the theoretical melting temperature, may be investigated for micro or nanocrystalline properties. In still further embodiments, bulk metallic glass alloys may be used to form micro, nanocrystalline or partially crystalline alloys without modification. For example, alloys within the above classes may be cooled at different rates or under different conditions to allow at least some crystallinity in the alloy.

FIGS. 2 through 5 are x-ray diffraction spectrograms of alloys determined according to an embodiment of the invention. As discussed herein, in some applications may be desirable to provide compositions that are partially amorphous and partially nanocrystalline. For example, these coatings may be useful in wear and corrosion resistant twin wire arc spray coatings. In some applications, the coating may benefit from having some limited amount of crystallinity in the coating to act as a binder phase for the remaining hard amorphous particles.

Figure 2:
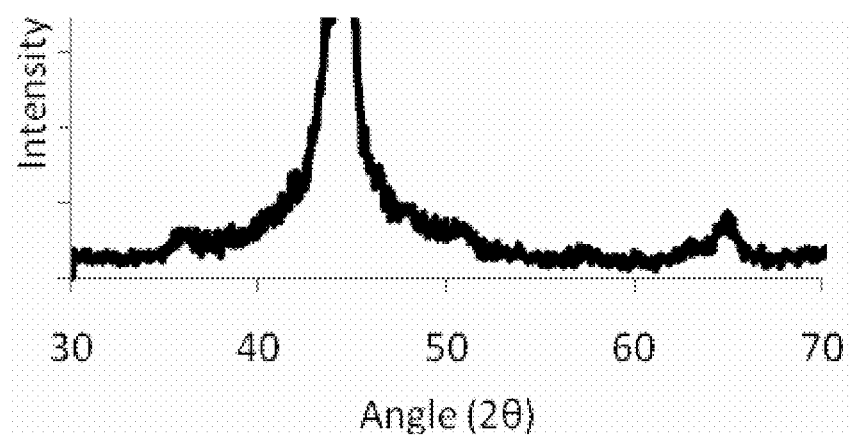
FIG. 2 is an x-ray diffraction spectrum embodiment of the invention.

FIG. 2 is an x-ray diffraction spectrogram illustrating a twin wire arc spray coating having the following composition:

|  | Element | | | | | | |
| --- | --- | --- | --- | --- | --- | --- | --- |
|  | Fe | Cr | Mo | C | B | W | Ni |
| wt percent (atomic percent) | 62 (56.3) | 13 (12.7) | 12 (6.3) | 2.2 (9.3) | 2.2 (10.3) | 3.8 (1) | 4.8 (4.1) |

In the illustrated coating, an amorphous phase fraction of approximately 75-85% was formed in the composition. In this composition, the Fe, Cr, and Ni occupy solvent sites, the Mo and W occupy primary solute sites, and the C and B occupy secondary solute sites. Accordingly, in the illustrated embodiment, elements occupying solvent sites comprise approximately 73 at. % of the alloy; elements occupying primary solute sites comprise approximately 7.3 at. % of the alloy; and elements occupying secondary solute sites comprise approximately 19.6 at. % of the alloy. In further embodiments, the specific elements occupying the topological sites may vary without significantly changing the atomic percentages of elements occupying those top logical sites. For example, in a further embodiment, an alloy may be formed by reducing the percentage of chromium while increasing the percentage of nickel to form an alloy having a melting temperature that is approximately 5% less than the calculated rule-of-mixtures melting temperature. In still further embodiments, the percentage of occupied sites may vary. For example, the atomic percentages of elements occupying the secondary solute sites may be increased at the expense of the elements occupying the solvent sites to form an alloy having a melting temperature that is approximately 3% less than the calculated rule-of-mixtures melting temperature.

Figure 3:
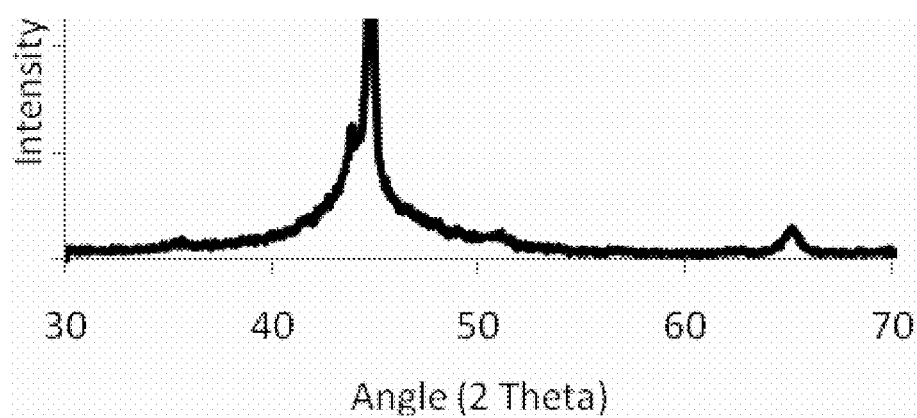
FIG. 3 is an x-ray diffraction spectrum of embodiment of the invention.

FIG. 3 is an x-ray diffraction spectrogram illustrating a twin wire arc spray coating having the following composition:

|  | Element | | | | | | |
| --- | --- | --- | --- | --- | --- | --- | --- |
|  | Fe | Cr | Nb | B | Ni | Si | Mn |
| wt percent (atomic percent) | 65.6 (56.5) | 14.5 (13.4) | 8.6 (4.5) | 4.2 (18.7) | 4.8 (3.9) | 1.1 (1.9) | 1.2 (1.1) |

The illustrated composition has an amorphous phase fraction of approximately 45-55%. In this composition, the Fe, Cr, Ni, and Mn occupy solvent sites, the Nb occupies primary solute sites, and the Si and B occupy secondary solute sites. Accordingly, in the illustrated embodiment, the elements occupying the solvent sites make up approximately 74.9 at. % of the composition; elements occupying the primary solute sites make up approximately 4.5 at. % of the composition; and elements occupying secondary solute sites comprise approximately 20.6 at % of the composition. As described herein, some variations of this alloy might comprise, substituting similarly sized elements at appropriate topological sites, such as a substituting Ga for Ni; other variations of this alloy might comprise increasing or decreasing the atomic, percentages of the various sites, such as decreasing or increasing the atomic percent of primary solute site elements by 1-5% and increasing or decreasing the atomic percent of secondary solute site elements by a corresponding amount.

Figure 4:
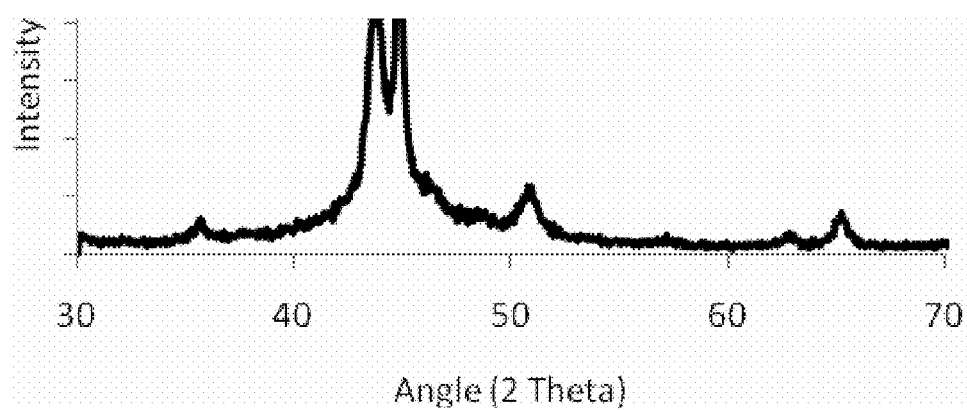
FIG. 4 is an x-ray diffraction spectrum of an embodiment of the invention.

FIG. 4 is an x-ray diffraction spectrogram illustrating a twin wire arc spray coating having the following composition:

|  | Element | | | | | |
| --- | --- | --- | --- | --- | --- | --- |
|  | Fe | Cr | Nb | B | Si | Mn |
| wt percent (atomic percent) | 65.9 (59) | 24.6 (23.9) | 4.6 (3) | 2.2 (10.3) | 1.5 (2.7) | 1.2 (1.1) |

The illustrated composition has an amorphous phase fraction of approximately 35-45%. In this composition, the Fe, Cr, and Mn occupy solvent sites, the Nb occupies primary solute sites, and the Si and B occupy secondary solute sites. Accordingly, in the illustrated embodiment, the elements occupying the solvent sites make up approximately 84 at. % of the composition; elements occupying the primary solute sites make up approximately 3 at. % of the composition; and elements occupying secondary solute sites comprise approximately 14 at. % of the composition.

Figure 5:
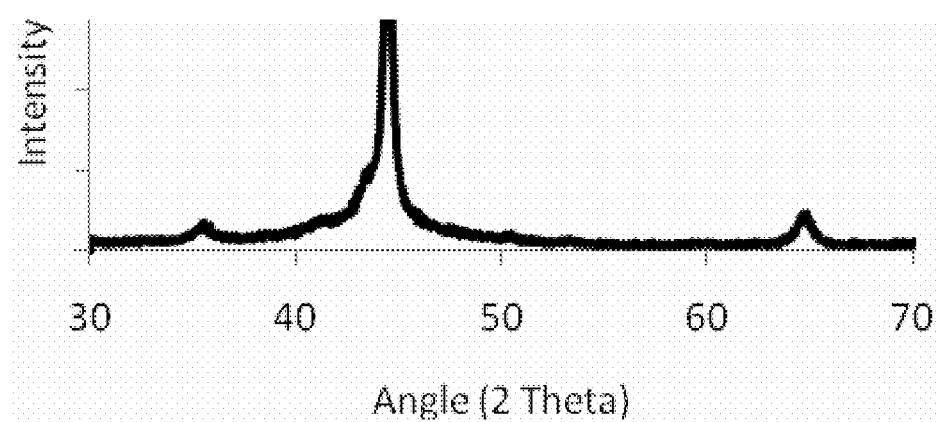
FIG. 5 is an x-ray diffraction spectrum of an embodiment of the invention.

FIG. 5 is an x-ray diffraction spectrogram illustrating a twin wire arc spray coating having the following composition:

|  | Element | | | | | |
| --- | --- | --- | --- | --- | --- | --- |
|  | Fe | Cr | C | B | W | Nb |
| wt percent (atomic percent) | 67.3 (64.3) | 9.6 (9.8) | 2.1 (9.3) | 1.6 (7.9) | 8.8 (2.6) | 10.6 (6.1) |

In this composition, the Fe and Cr occupy solvent sites, the Nb and W occupy primary solute sites, and the C and B occupy secondary solute sites. The illustrated composition has an amorphous phase fraction of approximately 0-20%.

In general, amorphous phase fraction and coating hardness will vary according to varying spray parameters. In the embodiments illustrated in FIGS. 2-5, the coating hardness as range from approximately between 800 and 1100 Vickers hardness. The particle hardness as our functions of the material compositions and not the coating porosity or inter particle adhesion. Typical embodiments of amorphous or nanocrystalline alloys formed within these classes have hardnesses that exceed 1200 Vickers.

Figure 6:
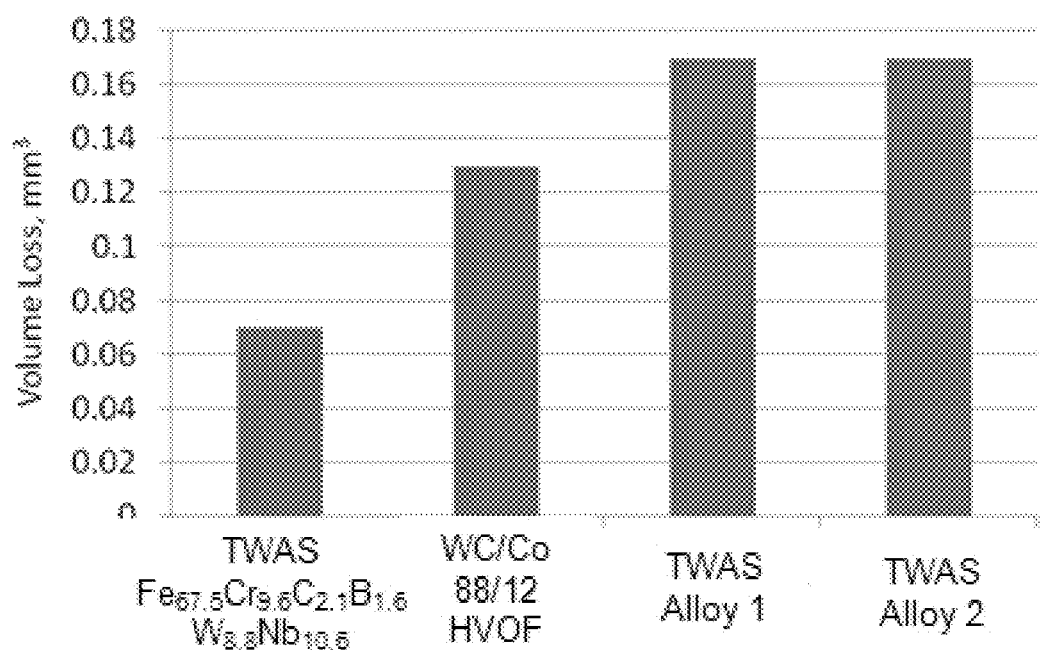
FIG. 6 is a wear performance comparison between an embodiment of the invention and other materials.
Figure 7:
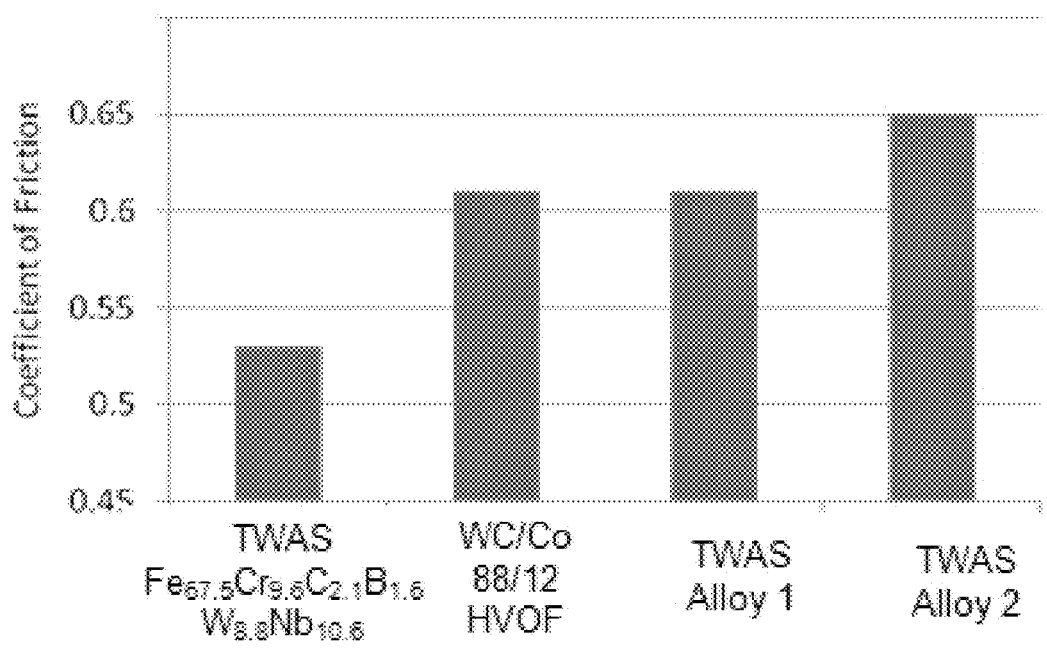
FIG. 7 is a coefficient of friction comparison between an embodiment of the invention and other materials.

FIGS. 6 and 7 are figures comparing known materials to the performance of an alloy according to an embodiment of the invention. In these figures, $Fe_{67.5}Cr_{9.6}C_{2.1}B_{1.6}W_{8.8}Nb_{10.6}$ was compared to a tungsten carbide/cobalt (WC/CO) having 88% at. % WC and 12 at. % Co; a first Fe-based fine grain coating comprising $Fe_{balance}C_{0.04-0.6}Si_{0.6-15}Cr_{25-30}Ni_{5-7}Mn_{1.2-2.4}B_{3.2-3.7}$ (Alloy 1); and a second Fe-based fine grain coating comprising $Fe_{balance}Cr_{<25}Mo_{<15}B_{<5}W_{<5}C_{<2}Mn_{<2}Si_{<2}$ (Alloy 2). In these comparisons, $Fe_{67.5}Cr_{9.6}C_{2.1}B_{1.6}W_{8.8}Nb_{10.6}$ and the two other Fe-based alloys were deposited on a surface as under a twin wire arc spray coating. Due to the properties of WC/Co, this material was deposited using a high velocity oxygen fuel thermal spray process. As these results demonstrate, embodiments of this invention may serve as superior materials for a variety of applications requiring hardness and wear resistance. For example, some embodiments of this invention may serve as superior materials for bearing coatings, or for bearings themselves.

FIG. 6 demonstrates the results of a volume loss comparison using the ASTM G77 metal sliding wear test. As the figure demonstrates, $Fe_{67.5}C_{9.6}C_{2.1}B_{1.6}W_{8.8}Nb_{10.6}$ had about a 0.07 mm³ volume loss in the test, while WC/Co had about a 0.13 mm³ volume loss and Alloy 1 and 2 each demonstrated about a 0.17 mm³ volume loss. As these results demonstrate, $Fe_{67.5}Cr_{9.6}C_{2.1}B_{1.6}W_{8.8}Nb_{10.6}$ demonstrated about an 86% improvement over WC/Co and about an 142% improvement over Alloys 1 and 2. As described herein, similarity in structures between this embodiment and other embodiments of the invention are expected to result in similar improvements.

FIG. 7 demonstrates the results of a coefficient of friction comparison using the ASTM G77 metal sliding wear test. As the figure demonstrates, $Fe_{67.5}Cr_{9.6}C_{2.1}B_{1.6}W_{8.8}Nb_{10.6}$ has a coefficient of friction of about 0.53, while WC/Co and Alloy 1 each have a coefficient of friction of about 0.61, and Alloy 2 has a coefficient of friction of about 0.65. As these results demonstrate, $Fe_{67.5}Cr_{9.6}C_{1.6}W_{8.8}Nb_{10.6}$ demonstrated about a 15% improvement over WC/Co and Alloy 1, and a 23% improvement over Alloy 2. As described herein, similarity in structures and properties between this embodiment and other embodiments of the invention are expected to result in similar improvements.

Figure 8:
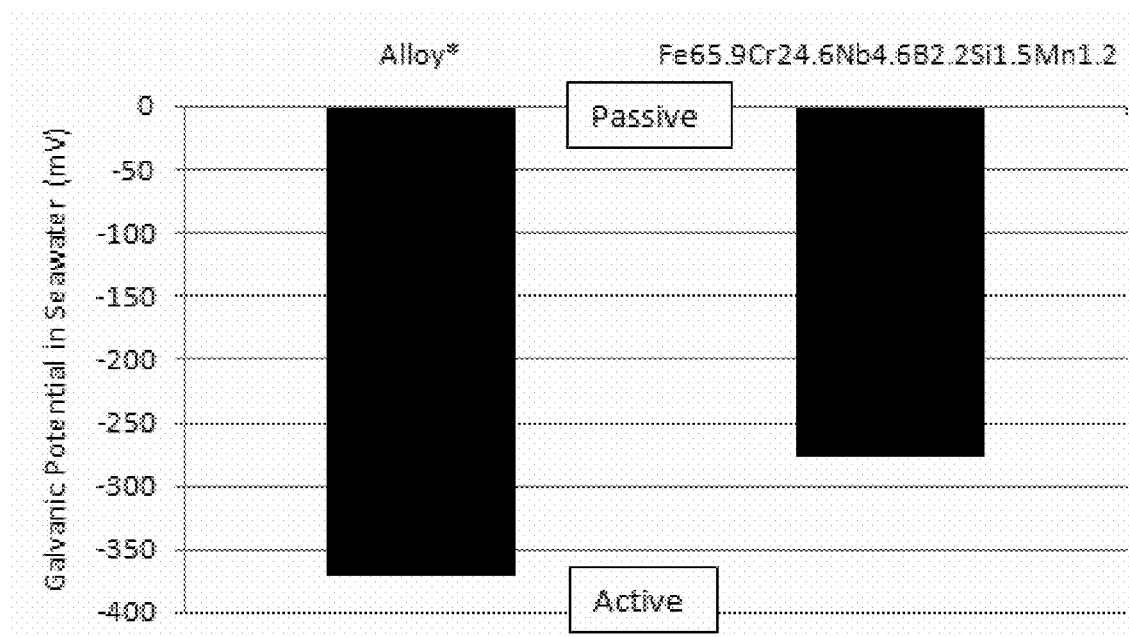
FIG. 8 is a galvanic potential comparison between an embodiment of the invention and another material.

FIG. 8 shows the results of a galvanic potential comparison between an embodiment of the invention and a comparison alloy. In this test, $Fe_{65.9}Cr_{24.6}Nb_{4.6}B_{2.2}Si_{1.5}Mn_{1.2}$ was compared to $Fe_{balance}C_{0.04-0.06}Si_{0.6-1.5}Cr_{25-30}Ni_{5-7}Mn_{1.2-2.4}B_{3.2-3.7}$ in a seawater galvanic cell with 316 stainless steel serving as a reference electrode. The alloy according to an embodiment of the invention demonstrated a galvanic potential of about −275 mV as compared to about −375 mV for $Fe_{balance}C_{0.04-0.06}Si_{0.6-1.5}Cr_{25-30}Ni_{5-7}Mn_{1.2-2.4}B_{3.2-3.7}$. These results demonstrate the superiority of some embodiments of the invention in corrosive environments, such as seawater. The results demonstrate that some embodiments of the invention have potentials similar to that of 400 series stainless steels. Accordingly, embodiments of the invention may serve as superior wear resistant coatings in applications such as ship hulls where traditional Fe-based coatings, even corrosive resistant coatings such as $Fe_{balance}C_{0.04-0.06}Si_{0.6-1.5}Cr_{25-30}Ni_{5-7}Mn_{1.2-2.4}B_{3.2-3.7}$, degrade too rapidly.

In various embodiments, many different materials may be formed using the methods described herein. For example, bulk metallic glass forming materials may be determined according to the Formula $Fe_{62-66}Cr_{13-25}(Mo,Nb)_{4-12}(C,B)_{2.2-4.4}Ni_{0-4.8}Si_{0-1.5}Mn_{0-1.2}W_{0-3.8}$, and particularly according to the formulae $Fe_{62-66}Cr_{14-16}Nb_{8-10}B_{4-4.4}Ni_{3-4.8}Si_{0-1.1}Mn_{0-1.2}$ and $Fe_{60-66}Cr_{20-25}Nb_{4-5}B_{1-3}Si_{1-1.5}Mn_{1-2}$. In further embodiments, composite materials may be formed by combining components that are formed according to these formulae.

As described herein, adjusting some parameters may result in materials that form nanocrystalline or fine grained structures. For example, such nanocrystalline or fine grained structure may comprise materials defined by the formula $Fe_{67-69}Cr_{9.6-10.9}(Mo,Nb)_{9.2-10.6}C_{1.4-2.1}B_{1.6-1.8}Si_{0-0.2}Ti_{7.3-9}$, and more particularly according to the formulae $Fe_{67-69}Cr_{9.6-10.9}C_{1.4-2.1}B_{1.6-1.8}W_{7.3-9}Nb_{9.2-10.6}$ and $Fe_{67-69}Cr_{9.6-10.9}Mo_{4-5.3}C_{1.4-2.1}B_{1.6-1.8}W_{7.3-9}Nb_{4-5.3}$. In further embodiments, composite materials may be formed by combining components that are formed according to these formulae. In still further embodiments, other amorphous forming materials may be similarly modified to result in materials that form nanocrystalline or fine grained structures.

In additional embodiments, composite materials may be made that tend to form partially amorphous and partially nanocrystalline or line grained structures. For example, one or more components defined by the above formulae for amorphous structured materials may be combined with one or more components defined by the above formulae for nanocrystalline or fine grained structured materials. In a specific embodiment, such a material may comprise a mixture of components selected from the group comprising:

$Fe_{62}Cr_{13}Mo_{12}C_{2.2}B_{2.2}W_{3.8}Ni_{4.8}$, (1)

$Fe_{65.9}Cr_{24.6}Nb_{4.6}B_{2.2}Si_{1.5}Mn_{1.2}$, (2)

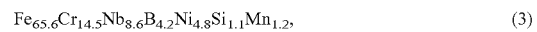

$Fe_{65.6}Cr_{14.5}Nb_{8.6}B_{4.2}Ni_{4.8}Si_{1.1}Mn_{1.2}$, (3)

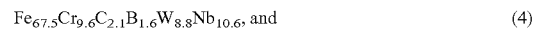

$Fe_{67.5}Cr_{9.6}C_{2.1}B_{1.6}W_{8.8}Nb_{10.6}$, and (4)

$Fe_{63.4}Cr_{9.4}Mo_{12.5}C_{2.5}B_{1.8}W_{10.4}$. (5)

Figure 9:
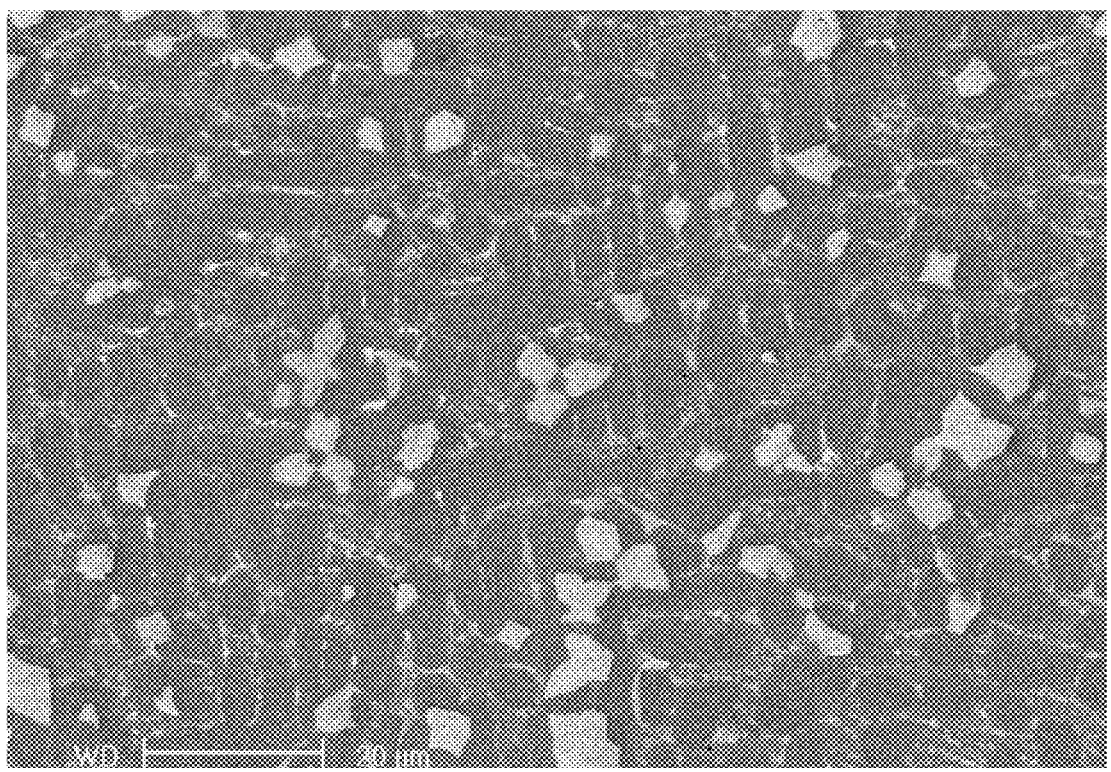
FIG. 9 is a scanning electron microscope image of an embodiment of the invention.
Figure 10:
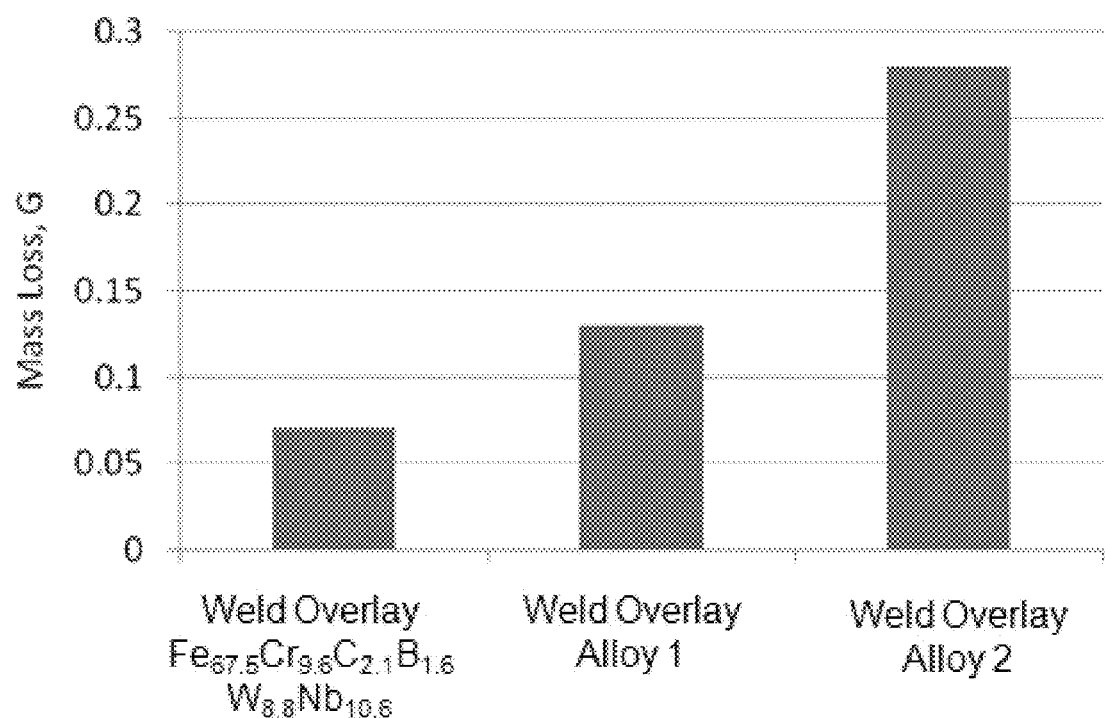
FIG. 10 is a dry sand wear test comparison between an embodiment of invention and other materials.

As described herein, some alloys that have a tendency to form amorphous or partially amorphous structures in some conditions are likely to form fine-grained weld overlays. Accordingly, some embodiments of the invention demonstrate improved hardness and toughness in hardface welding applications. FIG. 9 is a scanning election microscope (SEM) image of an alloy according to an embodiment of the invention, $Fe_{67.5}Cr_{9.6}C_{2.1}B_{1.6}W_{8.8}Nb_{10.6}$, demonstrating this fine grain structure in a weld overlay coating. FIG. 10 illustrates the results of a test comparing the alloy of FIG. 9 to a first. Fe-based fine grain coating comprising $Fe_{balance}C_{0.04-0.06}Si_{0.6-1.5}Cr_{25-30}Ni_{5-7}Mn_{1.2-2.4}B_{3.2-3.7}$ (Alloy 1) a id a second Fe-based fine grain coating comprising $Fe_{balance}C_{<25}Mo_{<15}B_{<5}W_{<5}C_{<2}Mn_{<2}Si_{<2}$ (Alloy 2). As illustrated, the alloy according the embodiment of the invention demonstrates a mass loss of about 0.07 G, compared to about 0.14 G for Alloy 1 and about 0.26 G for Alloy 2. Accordingly, the alloy of the embodiment of the invention demonstrates around a 100% to 200% improvement over Alloys 1 and 2.

Figure 11:
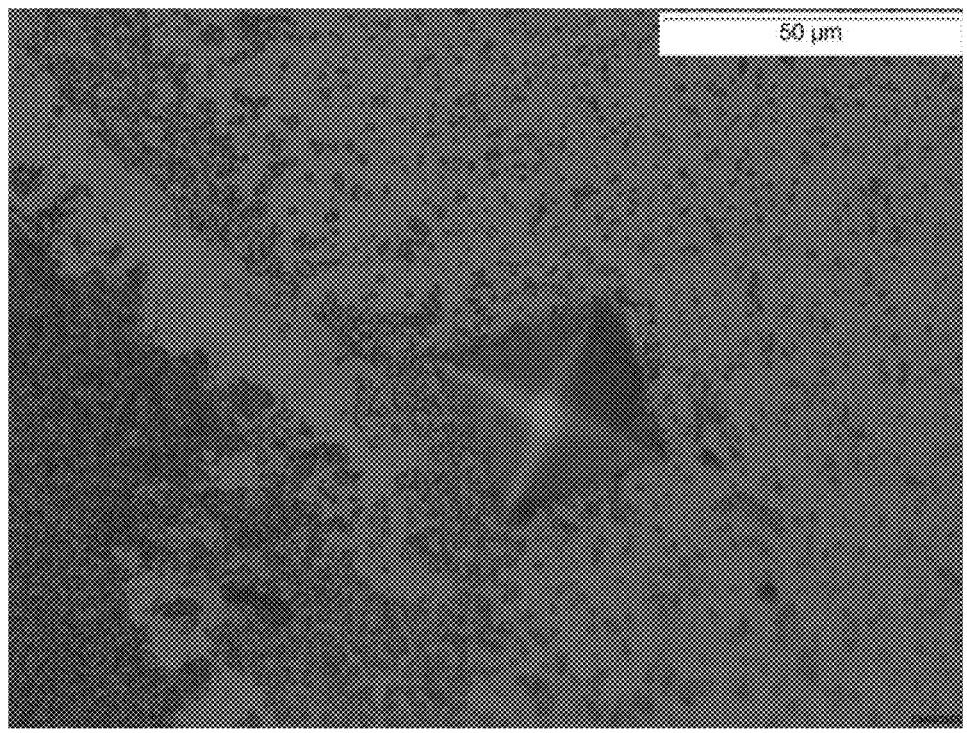
FIG. 11 is a scanning electron microscope image of the results of a Vickers indentation test on an embodiment of the invention.
Figure 12:
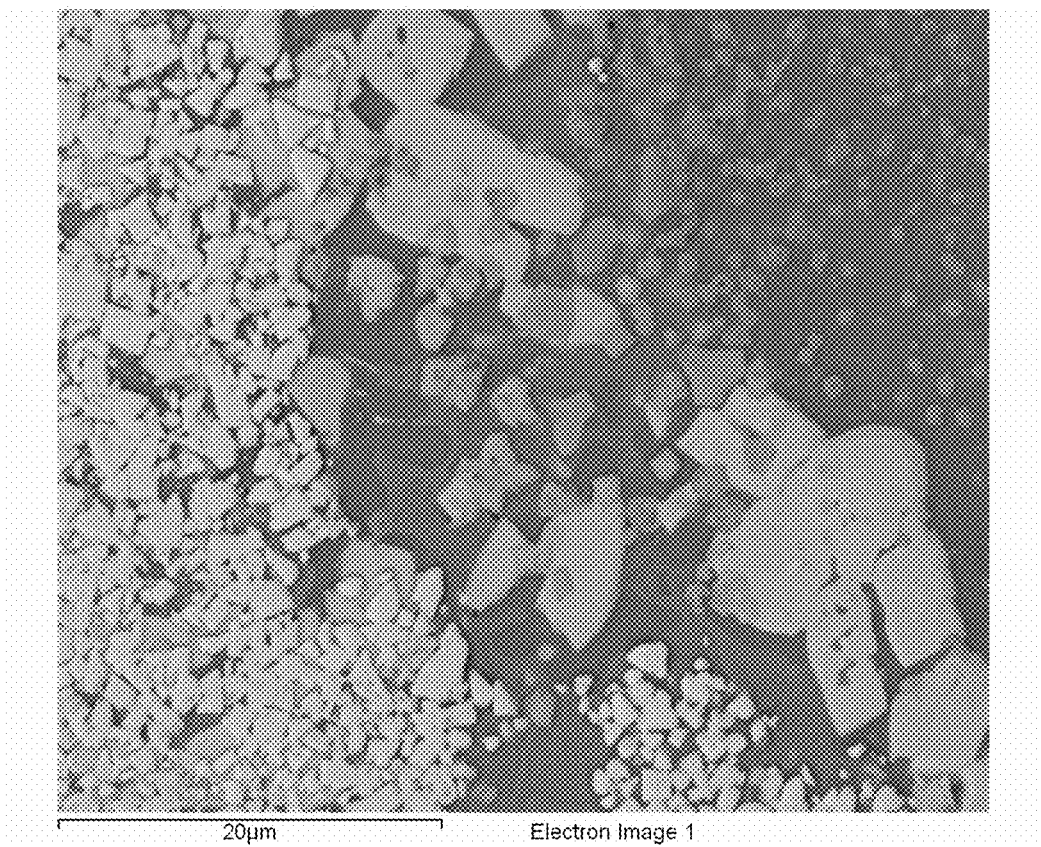
FIG. 12 is a scanning electron microscope image of an embodiment of the invention.
Figure 13A:
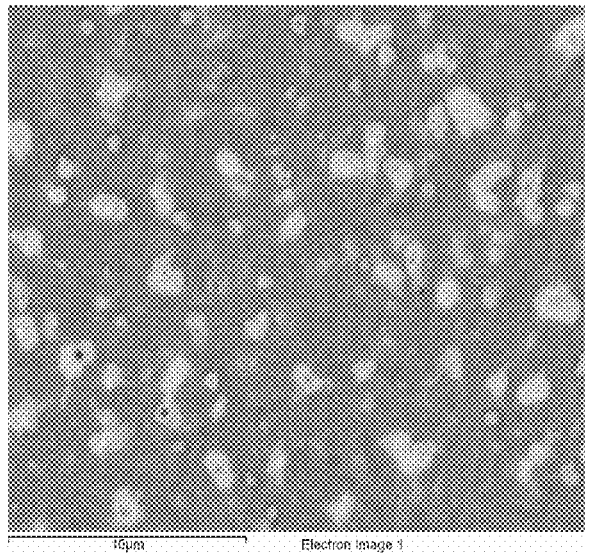
FIGS. 13A and 13B are scanning electron microscope images of an embodiment of the invention.
Figure 13B:
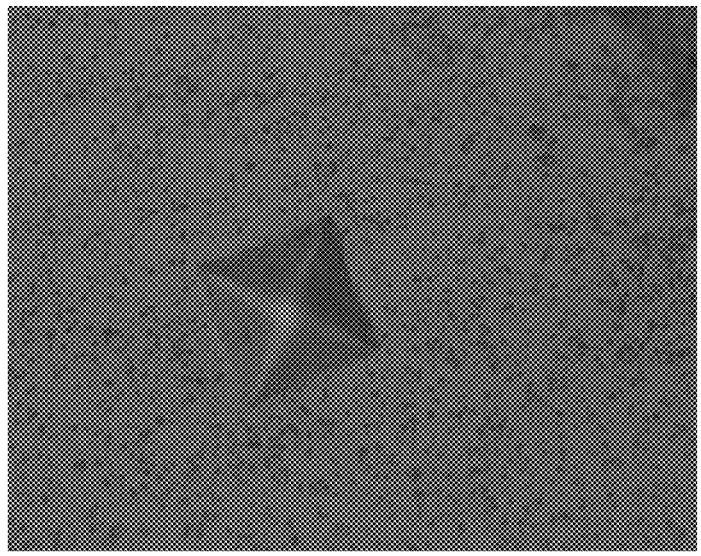

In some hardfacing applications, WC or other hard particles are used as reinforcing the weld overlay. For example, coarse hard carbide particles may be introduced into the weld bead as it is being deposited. Some embodiments of the invention allow enable hardfacing weld overlays to be formed using WC or other hard particle reinforcement without significant cracking or decreased toughness. Furthermore, when these embodiments are used for the matrix of such reinforced weld overlays, they retain the hardness and wear resistance described herein. FIG. 11 is an SEM image demonstrating the results of 1000 kg load Vickers indentation on a hardfacing weld overlay comprising a matrix of an alloy formed according to an embodiment of the invention and coarse carbide particles. In this test, $Fe_{75.1}Cr_{10}Nb_{10}B_{4.65}Ti_{25}$ was used as a matrix for coarse carbide particles where the coarse carbide particles constituted 50% by volume of the weld overlay. These test results demonstrate the toughness of some embodiments of the invention; even under a 1000 kg load Vickers indentation, there was no cracking at the interface between the carbide particles and the matrix. FIG. 12 is an SEM showing a portion of this interface. As this figure illustrates, the hard carbide particles reprecipitate at the interface as opposed to dissolving into the matrix, which would otherwise introduce brittleness into the matrix. FIG. 13 is a further illustration of the toughness of a carbide reinforced weld overlay according to an embodiment of the invention. FIG. 13A demonstrates the fine grain structure of a carbide reinforced weld overlay comprising $Fe_{75.1}Cr_{10}Nb_{10}B_{4.65}Ti_{25}$. FIG. 13B illustrates a further 1000 kg load Vickers indentation test, again demonstrating an absence of cracking at the interface between the carbide particles and the matrix.

Figure 14:
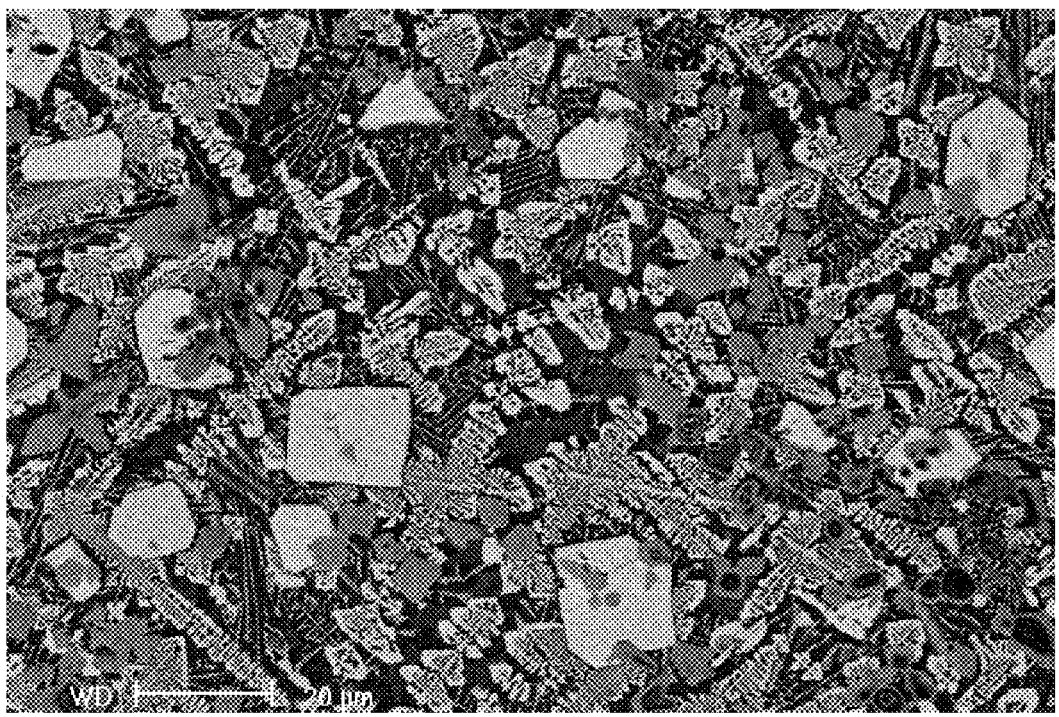
FIG. 14 is a scanning electron microscope image of an embodiment of the invention.

Further embodiments of the invention comprise ranges of alloys that demonstrate precipitation of a substantial fraction of hard carbide particles in carbide reinforced weld overlays. In one of the embodiments, a range of alloys is defined by the formula: $Fe_{67-71}Cr_{9.6-9.7}(Mo,Nb)_{8.8-10.6}C_{1.8-2.2}B_{1.4-1.6}W_{7.4-8.8}$. For example, the alloy discussed with respect to FIGS. 9 and 10 is an alloy within this embodiment. In a further embodiment, the range of alloys comprises alloys defined by the formula $Fe_{67-71}Cr_{9.6-9.7}Mo_{8.8-10.5}C_{1.8-2.2}B_{1.4-1.6}W_{7.4-8.8}$. In further embodiments, an alloy may be made up of a plurality of components, wherein one or more of the components comprises alloys defined by these formulae. Materials formed according to these embodiments have typical hardnesses of 1300-1450 Vickers hardness throughout the entire microstructures.

in another embodiment of the invention, a material that is suitable for hard particle reinforcement weld overlays comprises a component defined by the formula $Fe_{43-54}Cr_{5.7-7.2}(Mo,Nb)_{6.6-15.5}C_{1-1.3}B_{1-1.8}W_{9.98-28}Ti_{1-7}$. In further embodiments, such a component may be defined by the formula $Fe_{50.5-53.2}Cr_{6-7.2}O_{6-7.2}Mo_{6.6-7.2}C_{1.3-1.6}B_{1-1.2}W_{25-26.6}Ti_{3-5}$. In additional embodiments, a component material may be defined partially by the first formula and partially by the second. For example, a component right comprise $Fe_{52}Cr_{5.7}Mo_{8.9}C_{1.1}W_{26.2}Ti_{6.1}$. In all further embodiments, an alloy comprises a plurality of components, wherein the components are each defined by one of the above formulae. Embodiments of the invention formed according to these formulae may demonstrate substantial precipitation of hard particles in reinforced weld overlay applications. For example, FIG. 14 is a SEM demonstrating the precipitation of WC particles in a slow quenched ingot having a matrix comprising $Fe_{43.2}Cr_{5.7}Mo_{15.5}C_{1.8}B_{1.3}W_{27.5}Ti_5$. FIG. 14 further demonstrates that alloys formed according to these embodiments retain a fine-grained microstructure even under slow cooling conditions. Materials formed according to these embodiments have typical hardnesses of 1300-1450 Vickers hardness throughout the entire microstructures.

Figure 15:
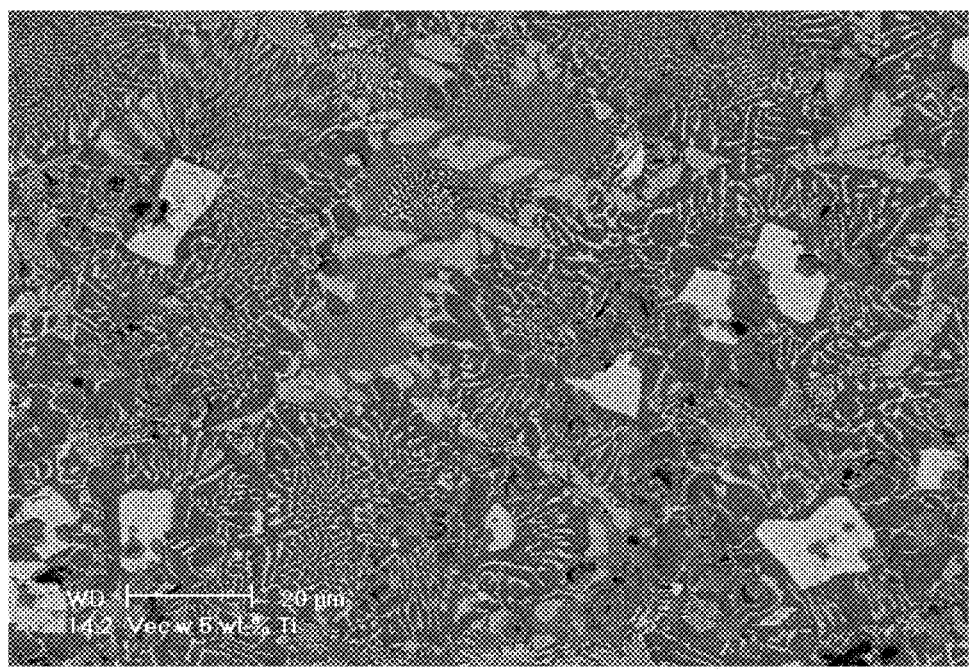
FIG. 15 is a scanning electron microscope image of an embodiment of the invention.

In one embodiment of the invention, a material that demonstrates hard particle precipitation comprises a component defined by the formula $Fe_{54-75}Cr_{9-14.4}Ni_{0.4-8}(Mo,Nb)_{7.9-19.7}C_{1.6-2.1}B_{1.3-4.6}W_{0-9.98}Ti_{0.25-7}Si_{0-1.1}Mn_{0-1.1}$. FIG. 15 demonstrates that a component comprising $Fe_{54.6}Cr_{7.2}Mo_{19.7}C_{2.1}B_{1.1}W_{9.5}Ti_5$ demonstrates precipitation of a high fraction of embedded hard particles during slow cooling. FIG. 15 further demonstrates the fine-grained nature of these embodiments that occur in non-amorphous phase forming conditions. In a further embodiment of the invention, materials may be formed having a component that is defined by the formula $Fe_{70-75}Cr_{9-10}Nb_{7-10}B_{4-4.6}Ti_{25-7}$, $Fe_{54-63}Cr_{7.2-9.6}Mo_{8.6-19.7}C_{1.6-2.1}B_{1.1-1.7}W_{8.5-9.5}Ti_{3-7}$. Additionally, in some embodiments, materials may be formed having components that comprise combinations of these formulae. Materials formed according to these embodiments have typical hardnesses of 1300-1450 Vickers hardness throughout the entire microstructures.

In further embodiments of the invention, materials may be formed that comprise mixtures of alloys formed according to the formulae described herein. For example, a material may be termed comprising a plurality of components that are defined by the formulae $Fe_{43-54}Cr_{5.7-7.2}(Mo,Nb)_{7.9-19.7}C_{1.6-2.1}B_{1.3-4.6}W_{0-9.98}Ti_{0.25-7}Si_{0-1.1}Mn_{0-1.1}$ and $Fe_{43-54}Cr_{5.7-7.2}(Mo,Nb)_{6.6-15.5}C_{1-1.3}B_{1-1.8}W_{9.98-28}Ti_{1-7}$. In a specific embodiment, a material comprises a mixture of one or more of the following components:

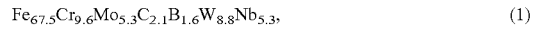   (1)

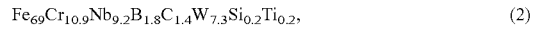   (2)

   (3)

   (4)

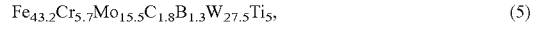   (5)

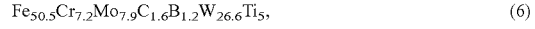   (6)

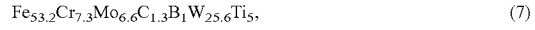   (7)

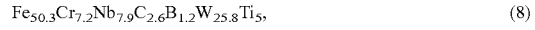   (8)

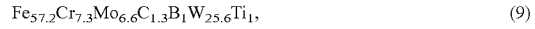   (9)

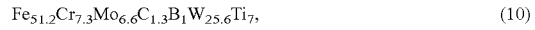   (10)

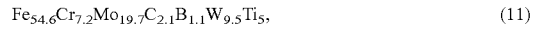   (11)

   (12)

   (13)

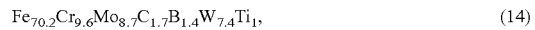   (14)

   (15)

   (16)

   (17)

   (18)

   (19)

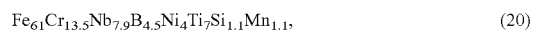   (20)

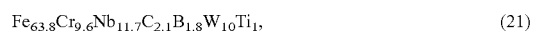   (21)

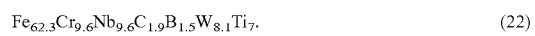   (22)

In a process according to one embodiment of the invention, coarse hard particles are combined with a hard matrix material comprising components described herein. This process comprises melting a component as described herein over a layer of coarse particles. For example, an arc melter may be used to melt a matrix material over a bed of coarse WC particles. In some embodiments, although melted WC may have a tendency to reprecipitate, it is desirable to minimize the amount of WC that dissolves into the melted matrix. In one embodiment, the coarse particles are disposed on a cooling body, such as a grooved hearth. For example, a water-cooled grooved copper hearth may be used. In this embodiment, the coarse particles are kept at a lower temperature to increase their resistance to dissolution. Accordingly, in these embodiments, the WC particles are allowed to metallurgically bind to the matrix without substantially dissolving into the matrix.

Figure 16:
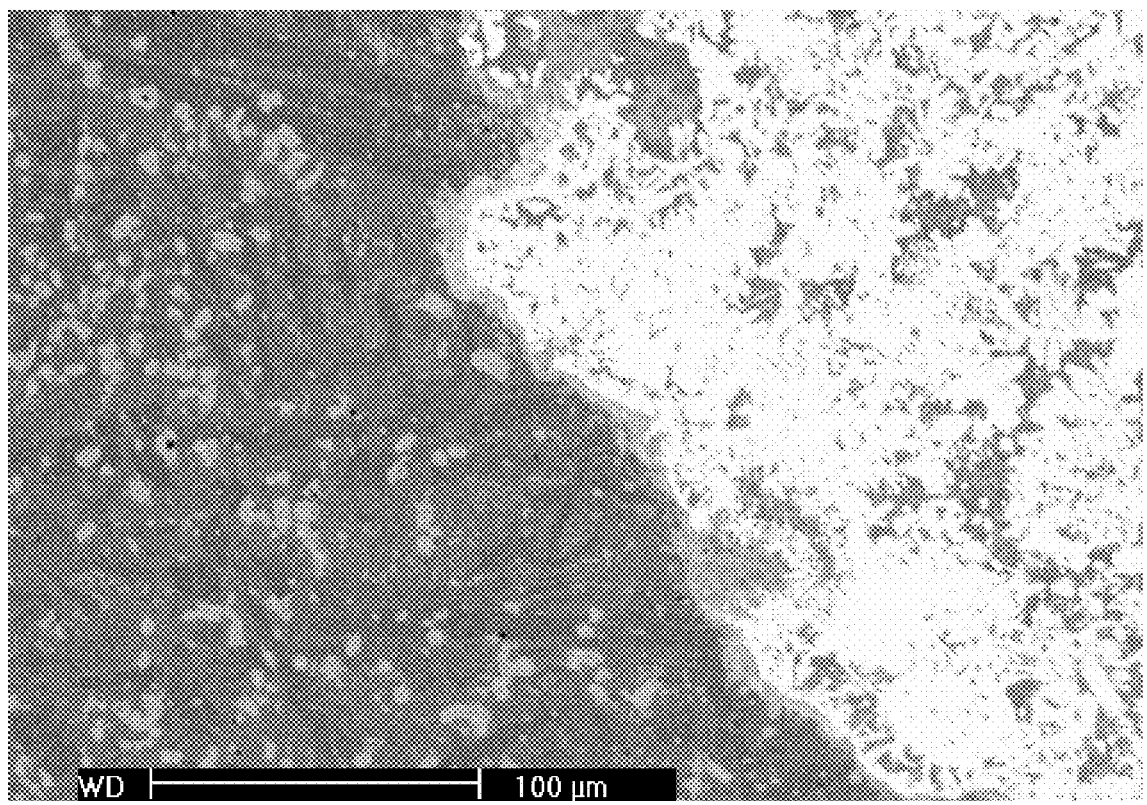
FIG. 16 is a scanning electron microscope image of an embodiment of the invention.
Figure 17:
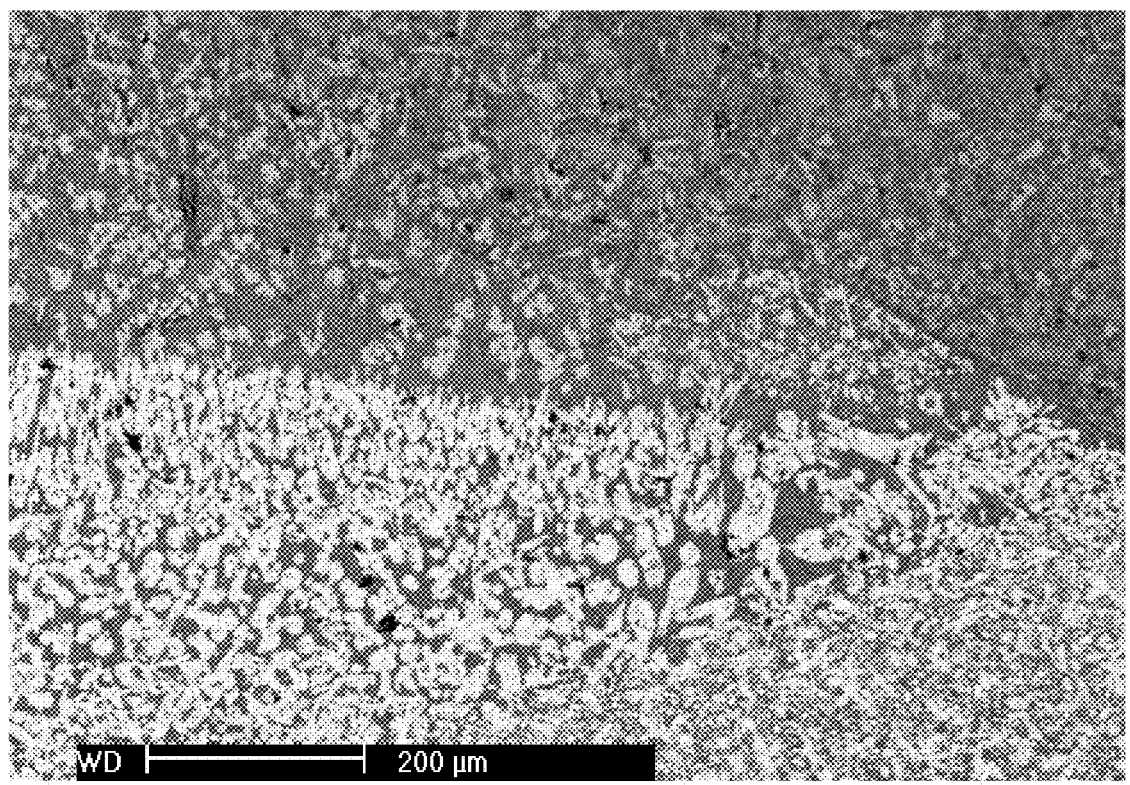
FIG. 17 is a scanning electron microscope image of an embodiment of the invention.

In particular experiments, this procedure was conducted using 30%, 40%, and 50% by weight coarse tungsten carbide particles, wherein the remaining weight percentages comprised a matrix material comprising components described herein. FIGS. 16 and 17 are SEM images demonstrating typical results of these experiments. FIG. 16 illustrates a typical result where 4-8 mesh 80-20 WC/Co was used as the hard particle, forming a composite material: $Fe_{37.6}Cr_5Nb_5C_{1.8}B_{2.4}W_{42.2}Co_6$. As this figure indicates, the matrix forms a metallurgical bond with the WC/Co particle without substantially dissolving the particle into the matrix. FIG. 17 illustrates a typical result where 4-8 mesh 88-12 WC/Co particles served as the hard particle, forming a composite material: $Fe_{52.7}Cr_7Nb_7C_1B_{3.3}W_{23}Co_6$. This figure also demonstrates a metallurgical bond between the WC/Co particle and the matrix, without substantial dissolution of the particle into the matrix. The materials formed according to this embodiment are Fe and W based compositions comprising composite materials of WC hard particles embedded in a hard matrix. In these experiments, the Vickers hardness of the WC is approximately 1400, while the matrix demonstrated Vickers hardnesses of approximately 1200 due to some dissolution of the coarse particles into the matrix. The materials also demonstrate resistance to cracking at the interlace between the particles and the matrix. Accordingly, these material are well-suited for applications where both extreme impact and extreme abrasive wear occur. In some embodiments, these materials may be pre-formed for use as components in other applications. As the materials cool, they may contract. Accordingly, the cooling surfaces, such as the grooved hearth, will typically be adjusted for such contractions.

In some embodiments, these composite materials may be formed using components defined by the formula $(Fe_{54.6-75.3}Cr_{7.2-24.6}Mo_{0-19.7}C_{0-2.3}B_{1.5-4.7}W_{0-9.5}Nb_{0-10}Ti_{0-7}Si_{0-1.5}Mn_{0-1.2})_x(W_{76.8-84.5}C_{3.2-3.5}Co_{12-20})_{100-x}$ where x=50-70. In these embodiments, a matrix material may therefore be defined by the formula $Fe_{54.6-75.3}Cr_{7.2-24.6}Mo_{0-19.7}C_{0-2.3}B_{1.5-4.7}W_{0-9.5}Nb_{0-10}Ti_{0-7}Si_{0-1.5}Mn_{0-1.2}$. In some specific embodiments, a composite material comprises one or more components defined by the formulae:

$$Fe_{38.2}Cr_5Mo_{13.8}C_{2.7}B_{1.2}W_{32}Ti_{3.5}Co_{3.6} \quad (1)$$

$$Fe_{27.2}Cr_{3.6}Mo_{9.9}C_{2.9}B_{0.9}W_{47}Ti_{2.5}Co_6 \quad (2)$$

$$Fe_{38.2}Cr_5Mo_{13.8}C_{2.7}B_{1.2}W_{32}Ti_{3.5}CO_{3.6} \quad (3)$$

$$Fe_{32}Cr_{4.6}Mo_5C_{2.6}B_{0.8}W_{42.5}Ti_{2.5}Co_{10} \quad (4)$$

$$Fe_{52.7}Cr_7Nb_7C_1B_{3.3}W_{23}Co_6 \quad (5)$$

$$Fe_{46.2}Cr_{17.2}Nb_{3.2}C_{1.1}B_{1.5}W_{25.3}Ti_{3.2}Si_{1.1}Mn_{0.8}Co_{3.6} \quad (6)$$

$$Fe_{49}Cr_{6.5}Nb_{6.5}C_{1.1}B_{3.1}W_{25.3}Co_6Ti_{4.9}CO_{3.6} \quad (7)$$

$$Fe_{37.6}Cr_5Nb_5C_{1.8}B_{2.4}W_{42.2}CO_6 \quad (8)$$

In further embodiments, other materials disclosed herein may serve as suitable matrix materials. For example, the compounds described above with respect to weld overlay applications may serve as suitable matrix materials for these composite materials.

As described herein, a variety of elements may occupy solvent sites in various embodiments of the invention. For example, both Fe and Ni have an atomic radius of 128 Å. Accordingly, Ni may be substituted for some or all of an amount of Fe in the materials and components described herein. For example, in the material described with respect to FIG. 3, $Fe_{65.6}Cr_{14.5}Nb_{8.6}B_{4.2}Ni_{4.8}Si_{1.1}Mn_{1.2}$, arbitrary amounts of Ni may be substituted for arbitrary amounts of Fe, such that the melting temperature of the resultant alloy remains at least approximately 5% less than the melting temperature predicted by a rule of mixtures. In some embodiments, these materials containing Ni may be particularly well-suited for brazing applications. In particular embodiments, these brazing alloys comprise alloys having components defined by the formula $(Ni,Fe)_{50-95}(Si,B,P)_{0-20}Cr_{0-35}$. In further embodiments the relationship between Ni and Fe may be further defined according to the methods and processes described herein such as inspection of melting temperatures compared to rule of mixture melting temperatures. In a specific embodiment, such a braze material comprises at least one component selected from the group comprising $Ni_{52}B_{17}Si_3Fe_{28}$, $Ni_{55}B_{18}Cr_4Fe_{24}$, $Ni_{54}B_{14}Si_4$, $Cr_4Fe_{24}$, $Ni_{52}B_{20}Fe_{28}$, and $Fe_{43}Cr_{33}Ni_{10}B_{14}$.

In additional embodiments, the alloys may further contain additives to enhance or introduce various features. For example, small amounts of Al, Ca, Y, misch metal, or other materials may be added as oxygen getters. In the above formula, the addition of these oxygen getters results in the formula $(Ni,Fe)_{50-95}(Si,B,P)_{0-20}Cr_{0-35}(Al,CA,Y,misch)_{0-1}$ or more particularly $(Ni,Fe)_{50-95}(Si,B,P)_{0-20}Cr_{0-35}(Al,CA,Y,misch)_{0-0.2}$.

In further embodiments, hinder materials such as Al may be added to the compositions described herein. For example, the materials employed in twin wire arc spray methods described herein may be wrapped with a sheath such as mild steel, stainless steel, nickel, nickel chronic, or aluminum such that the resultant coating shows an increase in bond strength. In some embodiments, an amorphous or nanocrystalline coating produced using the twin wire arc spray method manufactured using a mild steel, stainless steel, nickel, or nickel chrome sheath resulted in bond strengths exceeding 8000 psi as measured by ASTM C 633. In further embodiments, wrapping an Al sheath around a solid or cored wire containing Ni-base materials described herein also may result in increased bond strengths. In additional embodiments, Al may be added to any material described herein in a range of concentrations. In these embodiments, the other elements of the typically be reduced by a proportional amount so maintain their relative concentrations. For example, Al may be added in concentrations of 0.5-10% to form materials having components defined by:

$$(Fe_{62-66}Cr_{13-14}(Mo,Nb)_{8-12}(C,B)_{4.2-4.4}Ni_{4.8}Si_{0-1.1}Mn_{0-1.2}W_{0-3.8})_{100-x}Al_x \quad (1)$$

$$(Fe_{67-69}Cr_{9.6-10.9}(Mo,Nb)_{9.2-10.6}C_{1.4-2.1}B_{1.6-1.8}Si_{0-0.2}Ti_{0-0.2}W_{7.3-9})_{100-x}Al_x \quad (2)$$

$$(Fe_{67-71}Cr_{9.6-9.7}Mo_{8.8-10.5}C_{1.8-2.2}B_{1.4-1.6}W_{7.4-8.8})_{100-x}Al_x \quad (3)$$

$$(Fe_{43-53}Cr_{5.7-7.2}(Mo,Nb)_{6.6-15.5}C_{1-1.3}B_{1.3-1.8}W_{9.98-28}Ti_{1-7})_{100-x}Al_x \quad (4)$$

$$(Fe_{61-75}Cr_{9-14.4}Ni_{0-4.8}(Mo,Nb)_{7.9-11.7}C_{1.6-2.1}B_{1.3-4.6}W_{0-9.98}Ti_{0.25-7}Si_{0-1.1}Mn_{0-1.1})_{100-x}Al_x \quad (5)$$

where x ranges from 0.5% to 10%. In a specific embodiment, increased bond strengths occur in some applications where components are defined by the formula $Fe_{65-67}Cr_{11-13}Nb_{4-6}B_{4-5}Ni_{4-6}Si_{0-1.5}Mn_{0-1.5}Al_{1-3}$. In particular, the composition $Fe_{67}Cr_{13}Nb_6B_4Ni_5Si_1Mn_1Al_2$ demonstrated a bond strength exceeding 10,000 psi. Accordingly, the addition of Al to materials described herein may further increase materials' utilities in applications requiring high coating bond strength and abrasion resistance.

Certain materials disclosed in the present disclosure can be directed toward weld overlay materials. In some embodiments, although they are suitable for other weld overlay hardfacing applications, the materials serve as a superior weld overlay material for the protection of tool joints in oil and gas drilling operations.

Some embodiments comprise an iron-based alloy capable of forming a crack free hardbanding weld overlay coating on a curved substrate of 6" or smaller without any pre-heating or slow cooling methods, resulting in a 60+ Rockwell C surface. In further embodiments, when welded, the alloy has a welded microstructure comprising a fine-grained ferritic matrix containing <10 μm Nb and W carbide precipitates. In still further embodiments, the alloys may be magnetic or non-magnetic in nature.

Particular embodiments comprise alloys falling within the range of alloys defined by the formula (in weight percent): $Fe_{67.3-77.05}Cr_{3-7}Nb_{4-7}C_{0.5-1.4}B_{0.6-1.75}W_{9.5-15.45}Ti_{0-0.5}Si_{0-0.5}Mn_{0-2}Ni_{0-2}$. Other embodiments comprise alloys falling within the range of alloys defined by the formula (in weight percent): $Fe_{67.3-77.05}Cr_{3-7}Nb_{4-7}C_{0.5-1.4}B_{0.6-1.75}W_{9.5-15.45}Ti_{0-0.5}Si_{0-0.5}Mn_{0-6}Ni_{0-3}$. A specific embodiment comprises the alloy given by the formula (in weight percent): $Fe_{74.35}Cr_5Nb_4V_2B_1C_{0.8}W_{12.45}Si_{0.15}Ti_{0.25}$. Other embodiments comprise the alloy given by the formula (in weight percent): $B_{1.15-1.25}C_{1.0-1.1}Cr_{4.8-5.0}Fe_{bal}Mn_{<1.0}Nb_{4.0-4.2}Si_{<1.0}Ti_{0.2-0.3}V_{1.95-2.05}W_{12.4-12.5}$. Other embodiments comprise the alloy given by the formula (in weight percent): $B_{1.15-1.25}C_{1.0-1.1}Cr_{4.8-5.0}Fe_{bal}Mn_{<1.0}Nb_{4.0-4.2}Si_{<1.0}Ti_{0.2-0.3}V_{0.40-0.60}W_{8.8-9.2}$.

Figure 18:
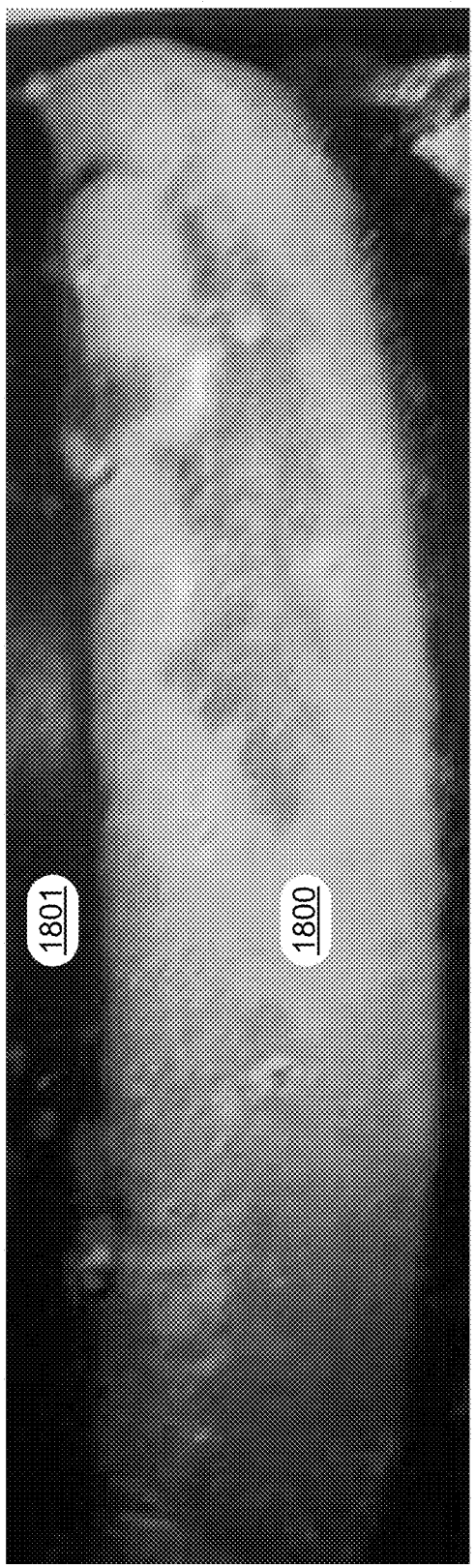
FIG. 18 is MIG weld bead of alloy on 4140 steel 6" diameter pipe showing no cracking or cross-checking as measured using liquid dye penetrant.

FIG. 18 illustrates a metal inert gas (MIG) weld bead of an alloy implemented in accordance with an embodiment of the invention. Here, alloy 1800 comprised the alloy defined by the formula (in weight percent): $Fe_{67.3-77.05}Cr_{3-7}Nb_{4-7}C_{0.5-1.4}B_{0.6-1.75}W_{9.5-15.45}Ti_{0-0.5}Si_{0-0.5}Mn_{0-6}Ni_{0-3}$. The weld bead 1800 was applied to a 4140 steel 6" diameter pipe 1801. As measured using, a liquid dye penetrant, the weld bead shoed no cracking or cross-checking.

In one embodiment, a microstructure of an alloy by the formula (in weight percent): $Fe_{74.35}Cr_5Nb_4V_2B_1C_{0.8}W_{12.45}Si_{0.15}Ti_{0.25}$ is provided. The microstructure of this alloy includes an optimized microstructure with a ferrite matrix having fine-grained niobium and tungsten based precipitates. These precipitates are less than about 10 μm on average and produce an alloy having a unique hardness and toughness. The matrix is a fine-grained ferritic/austenitic matrix which is fully interconnected. The matrix is able to blunt cracking and provides toughness to the overall material. The secondary phases and are extremely hard and are plentiful in the microstructure, forming up to 30% by volume fraction, but are isolated on each other by the interconnected matrix.

Three alloy compositions have been determined for manufacture into welding wires for hardbanding testing. The alloys have been determined from experimental results as part of an ongoing project to design hardbanding alloys, and subsequent laboratory analysis of potential alloys compositions. Initial laboratory results suggested these alloys as ideal candidates and the experimental welding trials have been conducted.

The alloy presented in this disclosure, namely, $Fe_{74.35}Cr_5Nb_4V_2B_1C_{0.8}W_{12.45}Si_{0.15}Ti_{0.25}$, immediately showed promise as the alloy formed a crack free weld overlay on a 6" round pipe without the use of a pre-heating step. Further analysis, including independent verification of a crack-free weld, and wear performance, indicated that the weld alloy represented a technological advance to currently used alloys and materials for use in oil and gas drilling.

The alloys presented in this disclosure offer many unique advantages to currently available weld overlay alloys, which when simultaneously utilized provide substantial benefit to the oil and gas drilling operation. Previously, no other single alloy could offer all these benefits to the hardbanding process and operation. Some of the advantages that embodiments of the invention present include the following.

First, crack-free as deposited welds: The alloys disclosed can be welded onto curved surfaces without the use of pre-heating or slow cooling techniques, and term a continuous crack free weld bead. The lack of pre-heating required is very advantageous not only because eliminates an extra step in the process, but it prevents the possible deterioration of the inner polymer coating which is commonly used in drill pipes and is subject to failure when the pipe is pre-heated. Slow cooling is also a step which is generally unavailable to hardbanding, done in the field, and it is advantageous if it is not required. Previously, these capabilities could be achieved only with weld overlay alloys that had substantially lower surface hardness levels.

Second, ability to be welded over itself and other weld beads without cracking: Weld overlays metallurgically bond to the substrate material and form a novel diluted alloy which is partially the original welding alloy and partially the substrate base material alloy. This dilution effect create different weld compositions depending upon the base metal that it is being welded onto. In the practice of oil drilling hardbanding it is common to re-weld over the top of a weld bead once it has partially worn away. In the case of many hardbanding alloys, this re-welding creates enough of a compositional shift in the weld when compared to welding atop of the original un-welded part, that cracking occurs in the re-weld whereas non occurred in the original weld. The alloys presented in this patent are have sufficient crack resistant such that they can be welded atop previous welds and experience no cracking. Previously, this capability could be achieved only with weld overlay alloys that result in substantially lower surface hardness levels.

Third, high hardness: The alloys described in this patent contain hardness levels of 60 Rockwell C or higher in the diluted condition when welded onto 4140 steel pipe under conditions similar to those used in the field application of hardbanding alloys for tool joints. Typical hardbanding alloys report 60+ Rockwell C values only when measured in the undiluted condition. However, in actual single pass weld overlays with significant dilution, which is the condition used for these applications, these alloys experience lower hardness values.

Fourth, improved wear resistance: The alloys described in this patent possess improved wear resistance compared to the previously most advanced hardbanding alloys used in oil and gas drilling operations. The wear resistance is measured using the ASTM G65 dry sand wear test. The wear loss of this alloy in the diluted condition (the condition typically used in the actual oil and gas drilling operations) was 0.1092 grams lost, significantly better than previous technologies which report un-diluted (condition resulting in lower wear losses, and not a condition used in the field) 0.12 g lost.

Fifth, the ability to absorb excess carbon with no or limited cracking: The alloys described in this patent are compositionally designed to form a high fraction of finely grained carbide precipitates. The thermodynamics inherent to these alloys allow excess carbon to be absorbed into the weld without altering the advantageous microstructure, resulting in no or minimal cracking. This effect is advantageous in the hardbanding industry as a MIG carbide process is typically used to create hardbanding weld beads. In this process, WC/Co particles (~1 mm in size) are fed into the weld bead as the weld is being made. This process creates a very difficult substrate to weld atop as there is a large concentration of W and C which will be introduced into the re-welded composition and microstructure. Previously used hardbanding alloys would experience drastic changes in microstructure and properties as a result of being re-welded onto this particular substrate. However, the designed chemistry of the alloy presented in this patent are flexible enough to absorb the excess carbon and tungsten and see relatively small changes in microstructure and properties. Thus, even when welded onto a un-worn MIG-carbide weld bead, they will experience only slight cross checking.

Sixth, optimal microstructure for limited casing wear: In drilling operations, the hardbanding weld beads constantly rub and wear against the outer easing. It is very critical that the hardbanding weld bead not wear away sufficiently against the casing so as to cause casing failure. Alloys which do not result in extreme casing wear are termed, 'casing friendly'. Early hardbanding techniques such as MIG carbide, where coarse carbide grains were introduced into the weld, resulted in extreme casing wear and proved unacceptable in drilling operations where a casing was a requirement. The MIG carbide welds are formed of a soft steel matrix containing large carbide grains. The wear behavior is such that the steel quickly wears a way leaving the sharp carbide particles to gouge away at the casing. In the alloys presented in this patent, the carbide particles are very fine and evenly distributed so as not to cruse highly localized regions of wear on the casing. Furthermore, the matrix is a hardened fine-grained structure, which exhibits hardening according to the Hall-Petch relationship. Thus, the casing will be in contact with a relatively smooth surface as opposed to a weld bead with sharp hard particles which locally wear and cause casing failure.

Some embodiments of hardbanding, materials comprise alloys falling within the range of alloys defined by the formula (in weight percent): $Fe_{65.3-79.95}Cr_{3-7}Ni_{0-6}Mn_{0-6}Nb_{3.5-7}V_{0-2.05}C_{0.5-1.5}B_{0.6-1.75}W_{8.5-15.45}Si_{0-1.0}Ti_{0-1}Al_{0-4}$. Particular embodiments comprise alloy defined by the formula (in weight percent): $Fe_{65.3-79.95}Cr_5Ni_{0-6}Mn_{0-6}Nb_{3.5-6}V_{0-2}C_{0.8-1.5}B_{0.8-1.4}W_{8.5-13.5}Si_{0.15}Ti_{0.25-1}Al_{0-4}$. Weight percents of various constituent elements in some exemplary embodiments falling within the range are listed in the following table:

| Alloy ID | Fe | Cr | Ni | Mn | Nb | V | C | B | W | Si | Ti | Al |
|---|---|---|---|---|---|---|---|---|---|---|---|---|
| H5A | 71.35 | 5 | 0 | 2 | 4 | 2 | 0.8 | 1 | 13.45 | 0.15 | 0.25 | 0 |
| H5B | 67.3 | 5 | 0 | 6 | 4 | 2 | 0.85 | 1 | 13.45 | 0.15 | 0.25 | 0 |
| H5C | 71.3 | 5 | 2 | 0 | 4 | 2 | 0.85 | 1 | 13.45 | 0.15 | 0.25 | 0 |
| H5D | 67.3 | 5 | 6 | 0 | 4 | 2 | 0.85 | 1 | 13.45 | 0.15 | 0.25 | 0 |
| H5E | 65.3 | 5 | 2 | 6 | 4 | 2 | 0.85 | 1 | 13.45 | 0.15 | 0.25 | 0 |
| H5F | 65.3 | 5 | 6 | 2 | 4 | 2 | 0.85 | 1 | 13.45 | 0.15 | 0.25 | 0 |
| H5G | 72.65 | 5 | 0 | 0 | 4 | 2 | 1.3 | 1.2 | 13.45 | 0.15 | 0.25 | 0 |
| H5H | 72.65 | 5 | 0 | 0 | 4 | 2 | 1.5 | 1 | 13.45 | 0.15 | 0.25 | 0 |
| H5I | 72.85 | 5 | 0 | 0 | 4 | 2 | 1.5 | 0.8 | 13.45 | 0.15 | 0.25 | 0 |
| H5J | 72.15 | 5 | 0 | 0.5 | 4 | 2 | 1.1 | 1.4 | 13.45 | 0.15 | 0.25 | 0 |
| H5K | 77.3 | 5 | 0 | 0 | 4 | 2 | 0.8 | 1 | 9.5 | 0.15 | 0.25 | 0 |
| H5L | 75.5 | 5 | 0 | 0 | 4 | 2 | 1 | 1.1 | 11 | 0.15 | 0.25 | 0 |
| H5M | 73.25 | 5 | 2 | 0 | 4 | 2 | 0.85 | 1 | 11.5 | 0.15 | 0.25 | 0 |
| H5N | 75.25 | 5 | 0 | 0 | 6 | 2 | 0.85 | 1 | 9.5 | 0.15 | 0.25 | 0 |
| H5O | 75.25 | 5 | 2 | 0 | 4 | 2 | 0.85 | 1 | 9.5 | 0.15 | 0.25 | 0 |
| H5P | 75.3 | 5 | 2 | 0 | 4 | 2 | 1 | 0.8 | 9.5 | 0.15 | 0.25 | 0 |
| H5Q | 70.8 | 5 | 0 | 0.5 | 4 | 2 | 0.85 | 1 | 13.45 | 0.15 | 0.25 | 0 |
| H5R | 73.3 | 5 | 2 | 0 | 6 | 2 | 1 | 0.8 | 9.5 | 0.15 | 0.25 | 0 |
| H5S | 73.8 | 5 | 3 | 0.5 | 4 | 2 | 1 | 0.8 | 9.5 | 0.15 | 0.25 | 0 |
| H5T | 72.8 | 5 | 4 | 0.5 | 4 | 2 | 1 | 0.8 | 9.5 | 0.15 | 0.25 | 0 |
| H5U | 66.9 | 5 | 6 | 0 | 4 | 2 | 1.4 | 0.8 | 13.5 | 0.15 | 0.25 | 0 |
| H5V | 72.3 | 5 | 3 | 2 | 4 | 2 | 1 | 0.8 | 9.5 | 0.15 | 0.25 | 0 |
| H5W | 73.3 | 5 | 3 | 1 | 4 | 2 | 1 | 0.8 | 9.5 | 0.15 | 0.25 | 0 |
| H5X | 72.1 | 5 | 3 | 2 | 4 | 2 | 1.2 | 0.8 | 9.5 | 0.15 | 0.25 | 0 |
| H5Y | 71.9 | 5 | 3 | 2 | 4 | 2 | 1.4 | 0.8 | 9.5 | 0.15 | 0.25 | 0 |
| H5& | 70.1 | 5 | 3 | 2 | 4 | 2 | 1.2 | 0.8 | 11.5 | 0.15 | 0.25 | 0 |
| H5Z | 70.9 | 5 | 6 | 0 | 4 | 2 | 1.4 | 0.8 | 9.5 | 0.15 | 0.25 | 0 |
| H7A | 78.75 | 5 | 0 | 0 | 4 | 0.25 | 1 | 1.1 | 9.5 | 0.15 | 0.25 | 0 |
| H7B | 79 | 5 | 0 | 0 | 4 | 0 | 1 | 1.1 | 9.5 | 0.15 | 0.25 | 2 |
| H7C | 76.75 | 5 | 0 | 0 | 4 | 0.25 | 1 | 1.1 | 9.5 | 0.15 | 0.25 | 4 |
| H7D | 74.75 | 5 | 0 | 0 | 4 | 0.25 | 1 | 1.1 | 9.5 | 0.15 | 0.25 | 0 |
| H7E | 78.75 | 5 | 0 | 0 | 4 | 0 | 1 | 1.1 | 9.5 | 0.15 | 0.5 | 0 |
| H7F | 78.25 | 5 | 0 | 0 | 4 | 0 | 1 | 1.1 | 9.5 | 0.15 | 1 | 0 |
| H7G | 78.5 | 5 | 0 | 0 | 4 | 0.5 | 1 | 1.1 | 9.5 | 0.15 | 0.25 | 0 |
| H7H | 78.55 | 5 | 0 | 0 | 4 | 0 | 1.2 | 1.1 | 9.5 | 0.15 | 0.5 | 0 |
| H7I | 78.85 | 5 | 0 | 0 | 4 | 0.25 | 1.2 | 0.8 | 9.5 | 0.15 | 0.25 | 0 |
| H7J | 78.75 | 5 | 0 | 0 | 4 | 0 | 0.8 | 1.3 | 9.5 | 0.15 | 0.5 | 0 |

-continued

| Alloy ID | Fe | Cr | Ni | Mn | Nb | V | C | B | W | Si | Ti | Al |
|---|---|---|---|---|---|---|---|---|---|---|---|---|
| H7K | 78.95 | 5 | 0 | 0 | 4 | 0.25 | 1 | 0.9 | 9.5 | 0.15 | 0.25 | 0 |
| H7L | 78.55 | 5 | 0 | 0 | 4 | 0.5 | 0.9 | 1.4 | 9 | 0.15 | 0.5 | 0 |
| H7M | 77.95 | 5 | 0 | 0 | 4 | 0.5 | 1 | 1.4 | 9.5 | 0.15 | 0.5 | 0 |
| H7N | 79.65 | 5 | 0 | 0 | 4 | 0 | 1.1 | 1.1 | 8.5 | 0.15 | 0.5 | 0 |
| H7O | 79.3 | 5 | 0 | 0 | 4 | 0 | 1 | 0.8 | 9.5 | 0.15 | 0.25 | 0 |
| H7P | 79.9 | 5 | 0 | 0 | 4 | 0 | 1 | 1.2 | 8.5 | 0.15 | 0.25 | 0 |
| H7Q | 79.95 | 5 | 0 | 0 | 4 | 0.25 | 1 | 0.9 | 8.5 | 0.15 | 0.25 | 0 |
| H7R | 79.75 | 5 | 0 | 0 | 4 | 0.25 | 1.1 | 1 | 8.5 | 0.15 | 0.25 | 0 |
| H7S | 79.85 | 5 | 0 | 0 | 3.5 | 0.25 | 1.1 | 0.9 | 9 | 0.15 | 0.25 | 0 |
| H7T | 78.65 | 5 | 0 | 0 | 4.5 | 0.25 | 1.1 | 1.1 | 9 | 0.15 | 0.25 | 0 |
| H7U | 78 | 5 | 0 | 0 | 4.5 | 0.5 | 1 | 1.1 | 9.5 | 0.15 | 0.25 | 0 |
| H7V | 78.75 | 5 | 0 | 0 | 4.5 | 0.25 | 1 | 1.1 | 9 | 0.15 | 0.25 | 0 |
| H7W | 79 | 5 | 0 | 0 | 3.5 | 0.5 | 1 | 1.1 | 9.5 | 0.15 | 0.25 | 0 |
| H7X | 78.75 | 5 | 0 | 0 | 4.5 | 0.25 | 1.1 | 1 | 9 | 0.15 | 0.25 | 0 |
| H7Y | 78.3 | 5 | 0 | 0 | 4.5 | 0.25 | 1.1 | 1.2 | 9 | 0.15 | 0.5 | 0 |
| H7Z | 78.25 | 5 | 0 | 0 | 4.5 | 0.25 | 0.9 | 1.2 | 9.5 | 0.15 | 0.25 | 0 |

Figure 19:
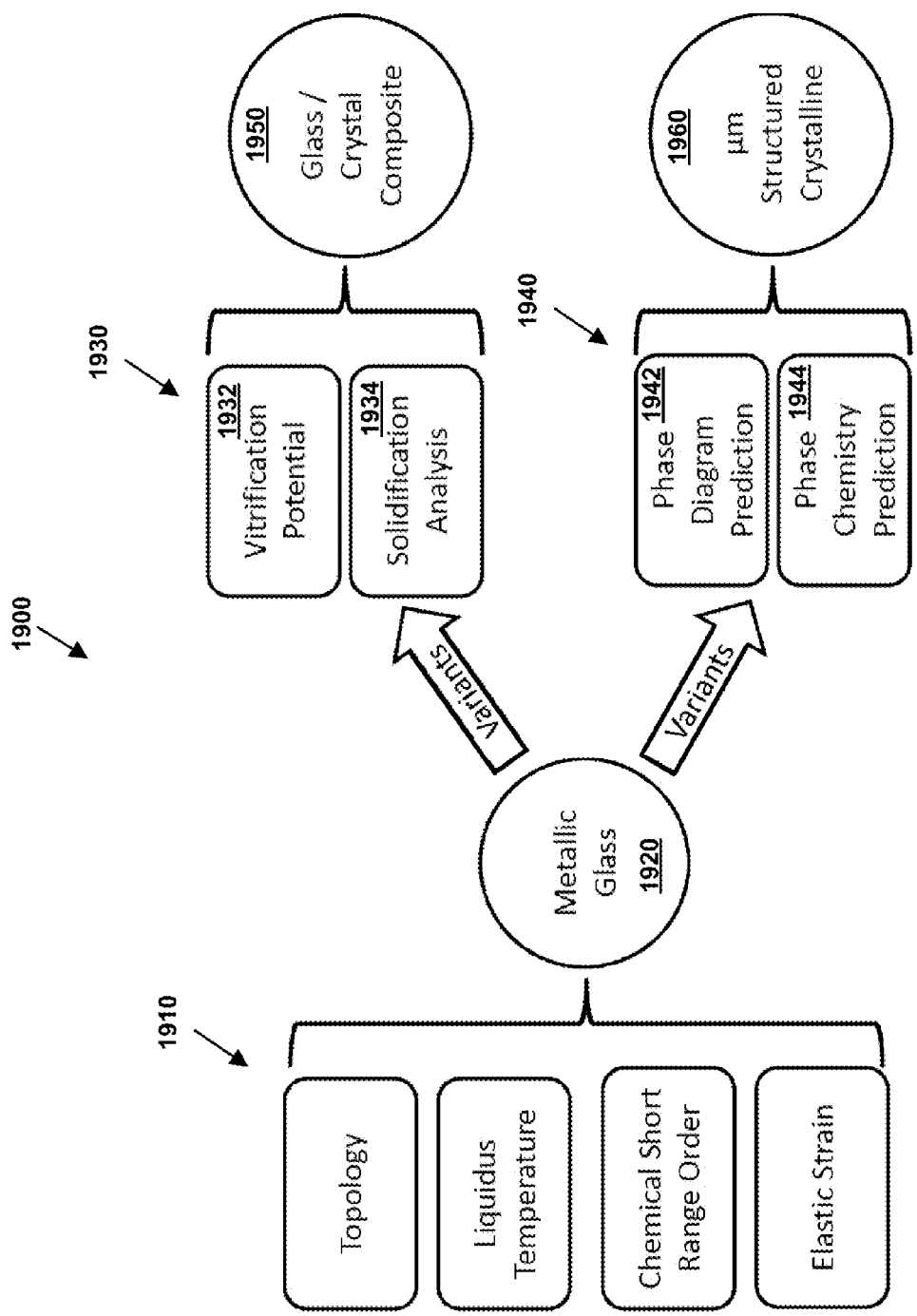
FIG. 19 is a diagram depicting an alloy design process according to certain aspects of the present disclosure.
Figure 20:
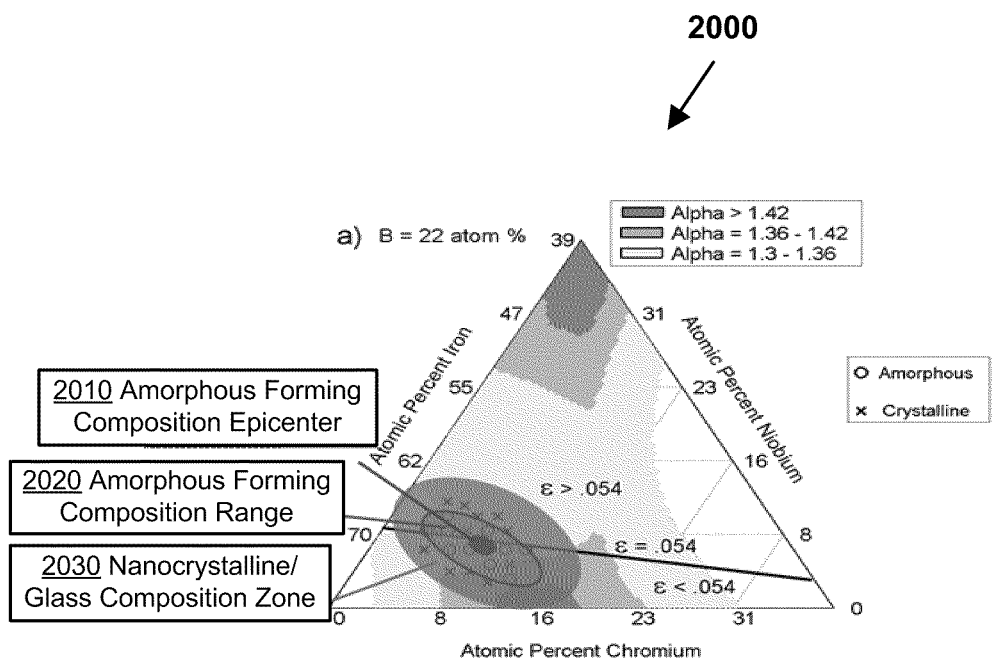
FIG. 20 is a graph illustrating an amorphous forming composition epicenter and an associated amorphous forming composition range according to certain aspects of the present disclosure.

FIG. 19 is a diagram depicting an alloy design process 1900 according to certain aspects of the present disclosure. The alloy design process comprises a 4-component metallic glass modeling technique based on topology, liquidus temperature, chemical short range order and elastic strain to determine an amorphous forming epicenter composition. An amorphous forming composition epicenter 2010 and an associated amorphous forming composition range 2020 are shown in diagram 2000 of FIG. 20. Various aspects of such a 4-component metallic glass modeling technique are described above in the present disclosure and also in University of California, San Diego Ph.D. dissertation "Modeling the Glass Forming Ability of Metals" by Justin Lee Cheney, which is incorporated by reference herein for all purposes. The modeling technique can be used to maximize the potential for amorphous forming ability for the design of an amorphous material 1920 having a metallic glass epicenter composition.

After determining an amorphous forming epicenter composition, a variant composition having a predetermined change in constituent elements from the amorphous forming epicenter composition is determined, and an alloy having the variant composition is formed and analyzed.

For example, a first or second variant technique 1930 or 1940 may be employed to design a thermal spray material (e.g., glass/crystal composite 1950) for use as a thermal spray wire or a fine-grained crystalline material (e.g., μm-structured crystalline 1960) for use as a weld overlay material, respectively.

A. Design of a Thermal Spray Material

The first variant technique 1930 for designing a thermal spray material (e.g., glass/crystal composite structures 1950) involves vitrification potential determination 1932 and solidification analysis 1934.

With regard to the vitrification potential determination 1932, in order to design glass/crystal composites, one or more variant compositions ranging from between about 5 and 1.0% atomic percent offset in constituent elements from an amorphous forming composition epicenter 2010 are chosen. As used herein, the term "about" means within normal manufacturing tolerances. This range is termed nanocrystalline/glass composite zone 2030 in diagram 2000 shown in FIG. 20. A variant composition in this nanocrystalline/glass composite zone can include one or more additional components that are not present in the amorphous forming epicenter composition. In certain embodiments, the variant composition includes between about 0.1 and 10% additional constituent that is not present in the amorphous forming, epicenter composition.

Figure 21:
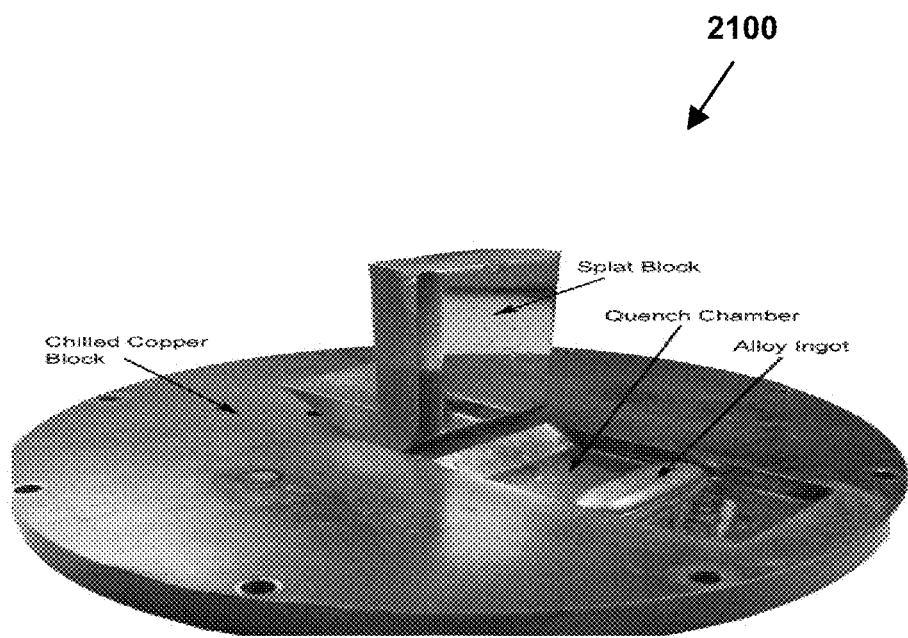
FIG. 21 shows an exemplary arc melter that can be used to melt an homogeneous alloy ingot for solidification analysis.

The solidification analysis 1934 can be performed through a lab-based technique to simulate the cooling rate in thermal spray materials thus determined in an exemplary setup 2108, an homogeneous alloy ingot is melted within an arc inciter such as the one shown in FIG. 21 in a water cooled copper cavity 2107. When a fully molten copper plate 2105, termed the splat block, is dropped onto the liquid alloy ingot 2106, the liquid alloy ingot is rapidly cooled in the form of a thin sheet (between about 0.25 and 1 mm) in thickness. The resulting composite nanocrystalline/glass microstructure can be evaluated using any known structural analysis methods including, but not limited to, XRD and SEM analysis. Those variant compositions that satisfy certain conditions (e.g., hardness and structural integrity) are selected. Variant compositions designed and selected through the processes described above can be produced as thermal spray wires, for instance.

B. Design of a μm Crystalline Structure (Weld Overlay Material)

The second variant technique 1940 for designing a fine-grained crystalline material (e.g., μm-structured crystalline 1960) can involve a phase diagram prediction 1942 and a phase chemistry prediction 1944.

Figure 22:
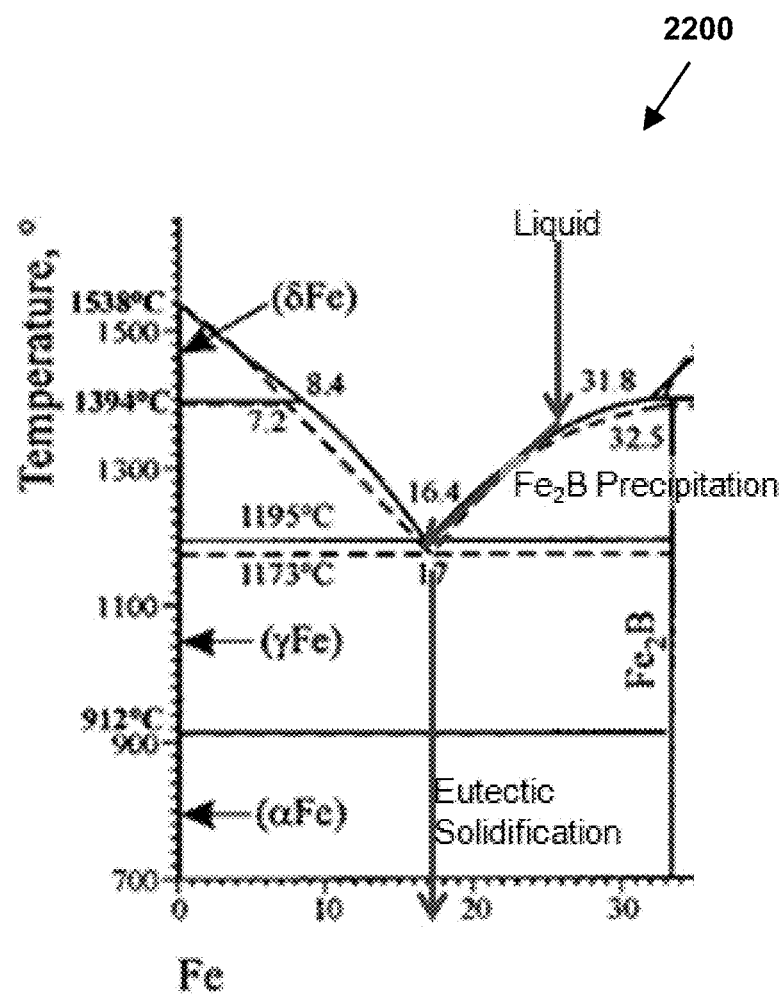
FIG. 22 is a phase diagram that is used for predicting behavior of an alloy when specific alloying elements are either added or subtracted from an amorphous forming epicenter composition according to certain aspects of the present disclosure.

In the phase diagram prediction 1942, specific alloying elements are either added or subtracted to encourage an evolution of desired crystalline phases in the microstructure, as illustrated by phase diagram 2200 shown in FIG. 22. The phase chemistry prediction 1944 can be used to model any shifts in elemental concentration of the liquid as primary crystallites nucleate.

Figure 23:
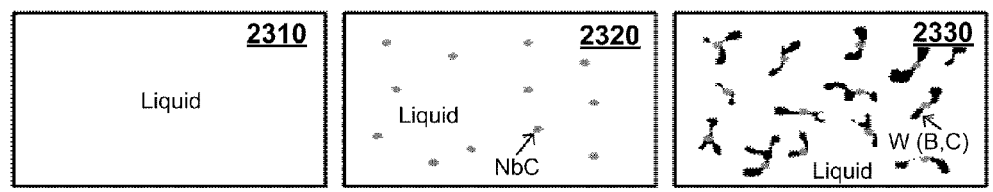
FIG. 23 is a diagram illustrating an exemplary alloy formation and analysis procedure.
Figure 24:
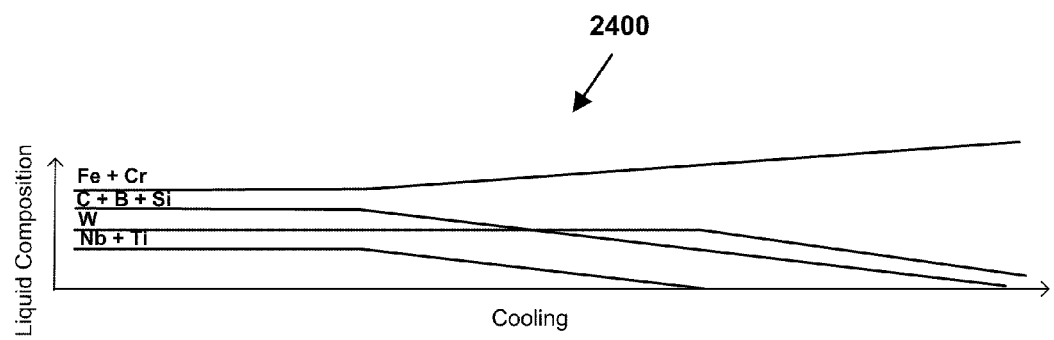
FIG. 24 is a diagram depicting liquid composition versus cooling curves for various constituent compositions.

Analysis of composition behavior is completed using specially designed experimental lab-based techniques to simulate the cooling rate of the weld. FIG. 23 illustrates an exemplary alloy formation and analysis procedure. In the procedure, an homogeneous alloy ingot is melted, e.g., within an arc melter in a water cooled copper cavity. Size of the homogenous alloy ingot being melted ("melt") is preferably between about 10 and 20 g to ensure that the cooling rate closely matches that experienced in MIG welding. FIG. 24 is a diagram 2400 depicting liquid composition versus cooling curves for various constituent compositions. Certain variant compositions designed analyzed and selected through the processes described above can be produced as welding wires, for instance.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one" "one or more" or the like; and adjectives such "conventional," "traditional," "normal," "standard," "known" and terms of similar meaning should not be construed as limiting the item described to a given time period or to an item available given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement the illustrated examples.

For example, block diagrams and their accompanying description should not be construed as mandating a particular architecture or configuration.

The invention claimed is:

1. An iron-based alloy having a microstructure comprising a fine-grained ferritic matrix and having a 60+ Rockwell C surface, wherein the ferritic matrix comprises <10 μm Nb and W carbide precipitates, the alloy given by the chemical formula (in weight percent):

$Fe_{65.3-79.95}Cr_{3-7}Ni_{0-6}Mn_{0-6}Nb_{3.5-7}V_{0-2.05}C_{0.5-1.5}$
$B_{0.6-1.75}W_{8.5-15.45}Si_{0-1.0}Ti_{0-1}Al_{0-4}$.

2. The alloy of claim 1, given by the chemical formula (in weight percent):

$Fe_{65.3-79.95}Cr_5Ni_{0-6}Mn_{0-6}Nb_{3.5-6}V_{0-2}C_{0.8-1.5}$
$B_{0.8-1.4}W_{8.5-13.5}Si_{0.15}Ti_{0.25-1}Al_{0-4}$.

3. The alloy of claim 1, given by the chemical formula (in weight percent):

$Fe_{67.3-77.05}Cr_{3-7}Ni_{0-3}Mn_{0-2}Nb_{3.5-7}C_{0.5-1.4}$
$B_{0.6-1.75}W_{9.5-15.45}Si_{0-0.5}Ti_{0-0.5}$.

4. The alloy of claim 3, given by the chemical formula (in weight percent):

$Fe_{74.35}Cr_5Ni_4V_2C_{0.8}B_1W_{12.45}Si_{0.15}Ti_{0.25}$.

5. The alloy of claim 1, given by the chemical formula (in weight percent):

$Fe_{67.3-77.05}Cr_{3-7}Ni_{0-3}Mn_{0-6}Nb_{4-7}C_{0.5-1.4}B_{0.6-1.75}$
$W_{9.5-15.45}Si_{0-0.5}Ti_{0-0.5}$.

6. The alloy of claim 1, given by the chemical formula (in weight percent):

$Fe_{bal}Cr_{4.8-5.0}Mn_{<1.0}Nb_{4.0-4.2}C_{1.0-1.1}V_{1.95-2.05}$
$B_{1.15-1.25}W_{12.4-12.5}Si_{<1.0}Ti_{0.2-0.3}$.

7. The alloy of claim 1, given by the chemical formula (in weight percent):

$Fe_{bal}Cr_{4.8-5.0}Mn_{<1.0}Nb_{4.0-4.2}C_{1.0-1.1}V_{0.40-0.60}$
$B_{1.15-1.25}W_{8.8-9.2}Si_{<1.0}Ti_{0.2-0.3}$.

8. A method of welding, comprising forming a crack free hardbanding weld overlay coating with an iron-based alloy having a microstructure comprising a fine-grained ferritic matrix and having a 60+ Rockwell C surface, wherein the ferritic matrix comprises <10 μm Nb and W carbide precipitates wherein the alloy is given by the chemical formula (in weight percent):

$Fe_{65.3-79.95}Cr_{3-7}Ni_{0-6}Mn_{0-6}Nb_{3.5-7}V_{0-2.05}C_{0.5-1.5}$
$B_{0.6-1.75}W_{8.5-15.45}Si_{0-1.0}Ti_{0-1}Al_{0-4}$.

9. The method of claim 8, wherein the alloy is given by the chemical formula (in weight percent):

$Fe_{65.3-79.95}Cr_5Ni_{0-6}Mn_{0-6}Nb_{3.5-6}V_{0-2}C_{0.8-1.5}$
$B_{0.8-1.4}W_{8.5-13.5}Si_{0.15}Ti_{0.25-1}Al_{0-4}$.

10. The method of claim 8, wherein the alloy is given by the chemical formula (in weight percent):

$Fe_{67.3-77.05}Cr_{3-7}Ni_{0-3}Mn_{0-2}Nb_{3.5-7}C_{0.5-1.4}$
$B_{0.6-1.75}W_{9.5-13.5}Si_{0-0.5}Ti_{0-0.5}$.

11. The method of claim 10, wherein the alloy is given by the chemical formula (in weight percent):

$Fe_{74.35}Cr_5Ni_4V_2C_{0.8}B_1W_{12.45}Si_{0.15}Ti_{0.25}$.

12. The method of claim 8, wherein the alloy is given by the chemical formula (in weight percent):

$Fe_{67.3-77.05}Cr_{3-7}Ni_{0-3}Mn_{0-6}Nb_{4-7}C_{0.5-1.4}B_{0.6-1.75}$
$W_{9.5-15.45}Si_{0-0.5}Ti_{0-0.5}$.

13. The method of claim 8, wherein the alloy is given by the chemical formula (in weight percent):

$$Fe_{bal}Cr_{4.8-5.0}Mn_{<1.0}Nb_{4.0-4.2}C_{1.0-1.1}V_{1.95-2.05}B_{1.15-1.25}W_{12.4-12.5}Si_{<1.0}Ti_{0.2-0.3}.$$

14. The method of claim 8, wherein the alloy is given by the chemical formula (in weight percent):

$$Fe_{bal}Cr_{4.8-5.0}Mn_{<1.0}Nb_{4.0-4.2}C_{1.0-1.1}V_{0.40-0.60}B_{1.15-1.25}W_{8.8-9.2}Si_{<1.0}Ti_{0.2-0.3}.$$

15. A welding wire having a composition that forms a weld comprising an iron-based alloy having a microstructure comprising a fine-grained ferritic matrix and having a 60+ Rockwell C surface, wherein the ferritic matrix comprises <10 μm Nb and W carbide precipitates, the alloy given by the chemical formula (in weight percent):

$$Fe_{65.3-79.95}Cr_{3-7}Ni_{0-6}Mn_{0-6}Nb_{3.5-7}V_{0-2.05}C_{0.5-1.5}B_{0.6-1.75}W_{8.5-15.45}Si_{0-1.0}Ti_{0-1}Al_{0-4}.$$

16. The welding wire of claim 15, wherein the alloy is by the chemical formula (in weight percent):

$$Fe_{65.3-79.95}Cr_5Ni_{0-6}Mn_{0-6}Nb_{3.5-6}V_{0-2}C_{0.8-1.5}B_{0.8-1.4}W_{8.5-13.5}Si_{0.15}Ti_{0.25-1}Al_{0-4}.$$

17. The welding wire of claim 15, wherein the alloy is given by the chemical formula (in weight percent):

$$Fe_{67.3-77.05}Cr_{3-7}Ni_{0-3}Mn_{0-2}Nb_{3.5-7}C_{0.5-1.4}B_{0.6-1.75}W_{9.5-15.45}Si_{0-0.5}Ti_{0-0.5}.$$

18. The welding wire of claim 17, wherein the alloy is given by the chemical formula (in weight percent):

$$Fe_{74.35}Cr_5Ni_4V_2C_{0.8}B_1W_{12.45}Si_{0.15}Ti_{0.25}.$$

19. The welding wire of claim 15, wherein the alloy is given by the chemical formula (in weight percent):

$$Fe_{67.3-77.05}Cr_{3-7}Ni_{0-3}Mn_{0-6}Nb_{4-7}C_{0.5-1.4}B_{0.6-1.75}W_{9.5-15.45}Si_{0-0.5}Ti_{0-0.5}.$$

20. The welding wire of claim 15, wherein the alloy is given by the chemical formula (in weight percent):

$$Fe_{bal}Cr_{4.8-5.0}Mn_{<1.0}Nb_{4.0-4.2}C_{1.0-1.1}V_{1.95-2.05}B_{1.15-1.25}W_{12.4-12.5}Si_{<1.0}Ti_{0.2-0.3}.$$

21. The welding wire of claim 15, wherein the alloy is given by the chemical formula (in weight percent):

$$Fe_{bal}Cr_{4.8-5.0}Mn_{<1.0}Nb_{4.0-4.2}C_{1.0-1.1}V_{0.40-0.60}B_{1.15-1.25}W_{8.8-9.2}Si_{<1.0}Ti_{0.2-0.3}.$$

* * * * *